United States Patent [19]

Foster et al.

[11] Patent Number: 5,410,654

[45] Date of Patent: Apr. 25, 1995

[54] INTERFACE WITH ADDRESS DECODER FOR SELECTIVELY GENERATING FIRST AND SECOND ADDRESS AND CONTROL SIGNALS RESPECTIVELY IN RESPONSE TO RECEIVED ADDRESS AND CONTROL SIGNALS

[75] Inventors: David J. Foster, White Plains; Armando Garcia, Yorktown Heights, both of N.Y.

[73] Assignee: International Business Machines Corporation, Armonk, N.Y.

[21] Appl. No.: 733,517

[22] Filed: Jul. 22, 1991

[51] Int. Cl.6 .............................................. G06F 15/02
[52] U.S. Cl. ........................... 395/275; 395/325; 395/425; 395/725; 364/245.7; 364/251.7; 364/259.9; 364/DIG. 1
[58] Field of Search ................ 395/275, 325, 425, 725, 395/250, 400, 650, 200; 364/243, 942.8, 229.2, 230.3, 245.7, 251.7, 259.9

[56] References Cited

U.S. PATENT DOCUMENTS

| | | | |
|---|---|---|---|
| 3,573,855 | 4/1971 | Cragon et al. | 395/425 |
| 4,080,649 | 3/1978 | Calle et al. | 364/200 |
| 4,223,380 | 9/1980 | Antonaccio et al. | 364/200 |
| 4,481,580 | 11/1984 | Martin et al. | 364/200 |
| 4,484,273 | 11/1984 | Stiffler et al. | 364/200 |
| 4,495,575 | 1/1985 | Eguchi | 364/200 |
| 4,511,969 | 4/1985 | Koenig et al. | 364/200 |
| 4,648,034 | 3/1987 | Heninger | 364/200 |
| 4,663,706 | 5/1987 | Allen et al. | 364/200 |
| 4,675,811 | 6/1987 | Kishi et al. | 364/200 |
| 4,698,753 | 10/1987 | Hubbins et al. | 364/200 |
| 4,737,932 | 4/1988 | Baba | 395/325 |
| 4,843,540 | 6/1989 | Stolfo | 364/200 |
| 4,872,133 | 10/1989 | Leeland | 364/748 |
| 4,912,633 | 3/1990 | Schweizer et al. | 364/200 |
| 4,928,224 | 5/1990 | Zulian | 364/200 |
| 4,964,033 | 10/1990 | Williams | 364/200 |
| 5,008,817 | 4/1991 | Shibata et al. | 364/200 |
| 5,021,950 | 6/1991 | Nishikawa | 364/200 |
| 5,115,498 | 5/1992 | Maccianti et al. | 395/425 |
| 5,123,101 | 6/1992 | Sindhu | 395/400 |
| 5,134,700 | 7/1992 | Eyer et al. | 395/425 |
| 5,214,776 | 5/1993 | Bagnoli et al. | 395/425 |
| 5,226,134 | 7/1993 | Aldereguia et al. | 395/425 |
| 5,276,850 | 1/1994 | Sakane | 395/425 |
| 5,305,441 | 4/1994 | Okochi et al. | 395/325 |

FOREIGN PATENT DOCUMENTS

| | | |
|---|---|---|
| 0244540 | 11/1987 | European Pat. Off. . |
| 0392657A1 | 10/1990 | European Pat. Off. . |
| 0404128A2 | 12/1990 | European Pat. Off. . |
| 0418621A2 | 3/1991 | European Pat. Off. . |
| 2233480 | 1/1991 | United Kingdom . |

*Primary Examiner*—Thomas C. Lee
*Assistant Examiner*—Moustafa M. Meky
*Attorney, Agent, or Firm*—Perman & Green

[57] ABSTRACT

Interface circuitry for coupling to a microprocessor device. The interface circuitry includes an input for receiving address signal lines and control signal lines generated by the microprocessor device. The interface further includes an address decoder, responsive to the received address signal lines, for determining if a microprocessor-generated memory access is directed to a private memory, accessible only by the microprocessor device, or to a shared memory that is accessible by a plurality of microprocessor devices. Responsive to the address decoder, the interface circuitry provides first address signal lines and first control signal lines to the private memory in response to the microprocessor device generating a memory access to the private memory. Also responsive to the address decoder, the interface circuitry provides second address signal lines and second control signal lines for coupling to the shared memory in response to the microprocessor device generating a memory access to the shared memory. The interface circuitry further includes interrupt control circuitry, inter-processor interrupt circuitry, DMA circuitry, a serial bus interface, and also provides a plurality of miscellaneous functions for the microprocessor.

29 Claims, 9 Drawing Sheets

MEMORY READ TIMING

INTERFACE WITH ADDRESS DECODER FOR SELECTIVELY GENERATING FIRST AND SECOND ADDRESS AND CONTROL SIGNALS RESPECTIVELY IN RESPONSE TO RECEIVED ADDRESS AND CONTROL SIGNALS

CROSS REFERENCE TO RELATED PATENT APPLICATIONS

This patent application is related to the following commonly assigned U.S. patent applications: Ser. No. 07/734,432, filed Jul. 22, 1991, entitled "Scientific Visualization System", D Foster et al., now U.S. Pat. No. 5,327,570; Ser. No. 07/734,206, filed Jul. 22, 1991, entitled "A Universal Buffered Interface for Coupling Multiple Processors, Memory Units, and I/O Interface to a Common High-Speed Interconnect" A. Garcia, now abandoned; Ser. No. 07/734,359, filed, Jul. 22, 1991, entitled "High Performance I/O Processor", R. Pearson, now U.S. Pat. No. 5,276,684; Ser. No. 07/733,767, filed Jul. 22, 1991, entitled "A Serial Diagnostic Interface Bus for Multiprocessor Systems", D Foster et al., still pending.

1. Field of the Invention

This invention relates generally to multiprocessor data processing systems and, in particular, to method and apparatus for interfacing each of the processors to common, or shared, system resources and also to local, or private, processor resources.

2. Background of the Invention

System requirements needed to interact with and visualize large, time-dependent data sets include a large, high-bandwidth disk array to store the entire data set being processed, a high speed network to download a problem set, a large, high-speed memory to buffer all data required to process a single simulation time step, computational power that is adequate to manipulate, enhance, and visualize the data sets, and a real-time, high resolution visual display. Furthermore, it is important that these functions be provided within a highly programmable and flexible user environment.

To realize such large and complex systems a multiprocessor approach may be taken, wherein a plurality of data processors operate in parallel on the same aspect or on different aspects of the same task.

An important consideration in a multiprocessor system is the interfacing of each of the processors to common, or shared, system resources and also to local, or private, processor resources. As an example, it may be required to interface each processor to a global bus having a system memory coupled thereto, while also coupling each processor to a private memory.

The following chronologically ordered U.S. Patents teach aspects conventional data processing interface circuitry.

In U.S. Pat. No. 4,080,649, issued Mar. 21, 1978, entitled "Balancing the Utilization of I/O System Processors" to Calle et al., there is disclosed an input/output system that couples to a host processor through a system interface unit. The system interface includes interrupt processing logic and a processor intercommunication network that connects to each of at least two input/output processing units. Interrupts are said to be employed to achieve a balance in the utilization of the input/output processing units.

In U.S. Pat. No. 4,223,380, issued Sep. 16, 1980, entitled "Distributed Multiprocessor Communication System" to Antonaccio et al., there is disclosed a distributed multiprocessor communication system that includes a communications network routing unit at each processor. A time sliced intermodule communications bus is employed for transmitting messages.

In U.S. Pat. No. 4,481,580, issued Nov. 6, 1984, entitled "Distributed Data Transfer Control for Parallel Processor Architectures" to Martin et al., there is disclosed a bus interface unit for distributing the control of data transfers within single instruction stream, multiple data stream processors. Bus interface units (13, 14, 15) are each connected between local memories (18, 19, 20), respectively, and a main bus 10 having a main memory 16 connected thereto through a bus interface unit 12.

In U.S. Pat. No. 4,484,273, issued Nov. 20, 1984, entitled "Modular Computer System" to Stiffler et al., there is disclosed a multiprocessor system having varying numbers of processors, I/O processors, and memory cards. The processors are divided into groups, where the processors in a group share a processor bus. A processor bus is linked to a system bus through a shared interface unit. Within a processor group, there is a shared memory as opposed to a local, private memory for each of the processors. Communication between groups is accomplished via common memory areas.

In U.S. Pat. No. 4,511,969, issued Apr. 16, 1985, entitled "Control Channel Interface Circuit" to Koenig et al., there is disclosed a control channel interface (CCI) for interfacing a processor to a time division multiplexed (TDM) bus. Each CCI is polled by a master processor to determine if the CCI has information to send. A CCI may buffer information until it can dispose of the information after being polled.

In U.S. Pat. No. 4,648,034, issued Mar. 3, 1987, entitled "Busy Signal Interface Between Master and Slave Processors in a Computer System" to Heninger, there is disclosed an extended processing unit (EPU) that generates a busy signal under controllable circumstances. The busy signal is communicated to a CPU.

In U.S. Pat. No. 4,663,706, issued May 5, 1987, entitled "Multiprocessor Multisystem Communications Network" to Allen et al., there is disclosed a plurality of multiprocessor systems arranged in a high speed network so as to allow any processor in one system to communicate with any processor in another system. An interprocessor bus (IPB) controller 16 is said to control the data flow and other operations of the processors. Multiple ring buffers are employed for connecting multiple sets of processors together.

In U.S. Pat. No. 4,698,753, issued Oct. 6, 1987, entitled "Multiprocessor Interface Device" to Hubbins et al., there is disclosed a multiprocessor interface (MPIF) device that is used to interface two processors. The MPIF includes a dual ported RAM which can function as a FIFO, under the control of one processor, or as a shared memory.

In U.S. Pat. No. 4,843,540, issued Jun. 27, 1989, entitled "Parallel Processing Method" to Stolfo, there is disclosed a multiprocessor system organized as a binary tree, where each element in the tree contains a processor and an interface unit. The interface unit includes registers coupled to registers in the interface units of adjacent higher and lower elements in the tree structure. These registers are used for communication and message passing.

In U.S. Pat. No. 4,872,133, issued Oct. 3, 1989, entitled "Floating-Point Systolic Array Including Serial Processors" to Leeland, there is disclosed a systolic array processor wherein each element in the array contains a processing unit and a plurality of communication registers for communicating with N, S, E, and W processors. In addition, a global bus provides broadcast capabilities. An inter-element global bus 20 is time slotted and is connected to registers within a processing element. A global bus 55 is used to connect between systolic array chips.

In U.S. Pat. No. 4,912,633, issued Mar. 27, 1990, entitled "Hierarchical Multiple Bus Computer Architecture" to Schweizer et al., there is described a modular and hierarchical multiple bus computer architecture in which a master bus and a slave bus are substantially identical, and which communicate through a combination of an interface controller and a shared, dual port RAM.

In U.S. Pat. No. 4,928,224, issued May 22, 1990, entitled "Multiprocessor System Featuring Global Data Multiplation" to Zulian, there is disclosed a multiprocessor system having a shared memory and a local memory for each processor. By means of the most significant address bits, a processor can address its own local memory, the global memory, the local memory of any other processor, or the local memories of all other processors at once.

In U.S. Pat. No. 4,964,033, issued Oct. 16, 1990, entitled "Microprocessor Controlled Interconnection Apparatus for Very High Speed Integrated Circuits" to Williams there is disclosed a microprocessor-controlled circuit for interconnecting at least two very high speed integrated circuit chips having digital inputs and outputs. The circuit includes a local data bus, a microprocessor and associated memory, and a plurality of functional interface units. One functional interface unit is connected between the microprocessor and a local memory bus.

SUMMARY OF THE INVENTION

What is not taught by these U.S. Patents, and what is thus one object of the invention to provide, is an interface unit that couples a processor of a multiprocessor system to an associated private memory and, via a local processor bus, to a system bus having a shared memory coupled thereto.

It is a further object of the invention to provide an interface unit for coupling a processor of a multiprocessor system to both a private and a shared memory and that further includes interrupt control circuitry, inter-processor interrupt circuitry, DMA circuitry, a serial bus interface, and a plurality of miscellaneous functions for the processor.

It is one further object of the invention to provide each processor of a multiprocessor system, including both computational and I/O processors, with an interface unit for coupling the processor to a private and to a shared memory, the interface unit further including control circuitry controlling the operation of a one line cache, external to the processor, that buffers read and write data passing between the processor and the shared memory.

It is another object of the invention to provide an interface unit for coupling to a processor of a multiprocessor system, the interface unit including circuitry for controlling read and write buffers external to the processor so as minimize accesses to a global bus, the interface unit optionally performing an automatic read buffer update after a predetermined number of processor reads of the read buffer.

It is another object of the invention to provide an interface unit for coupling to a processor of a multiprocessor system, the interface unit including circuitry for controlling read and write buffers external to the processor so as minimize accesses to a global bus, the interface unit optionally performing an automatic write buffer flush after a predetermined number of processor generated byte enables are accumulated.

The invention teaches interface circuitry for coupling to a microprocessor device. The interface circuitry includes an input for coupling to the microprocessor device for receiving address signal lines and control signal lines generated by the microprocessor device. The interface further includes an address decoder, responsive to the received address signal lines, for determining if a microprocessor-generated memory access is directed to a private memory, accessible only by the microprocessor device, or to a shared memory that is accessible by a plurality of microprocessor devices. Responsive to the address decoder, the interface circuitry provides first address signal lines and first control signal lines to the private memory in response to the microprocessor device generating a memory access to the private memory means. Also responsive to the address decoder, the interface circuitry provides second address signal lines and second control signal lines for coupling to the shared memory in response to the microprocessor device generating a memory access to the shared memory.

The interface circuitry of the invention is particularly useful in a multiprocessor embodiment wherein a plurality of processor devices share a common memory over a high speed system or global bus. The interface circuitry provides both a local (private) memory interface and a shared memory interface for an associated processor. The interface circuitry also provides a number of additional functions including interrupt control, inter-processor interrupt capability, and direct memory access functions for transferring data between the shared memory and the private memory. The interface circuitry also provides a number of miscellaneous functions such as programmable timer/counters, processor reset logic, and private memory refresh control. The interface circuitry also includes circuitry for interfacing to a serial diagnostic bus.

The interface circuitry furthermore manages external read and write buffers that are interposed between a processor node data bus and the global data bus. The read and write buffers function in a manner similar to a one line cache and serve to reduce the bandwidth requirements of the global bus.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Figure 1:
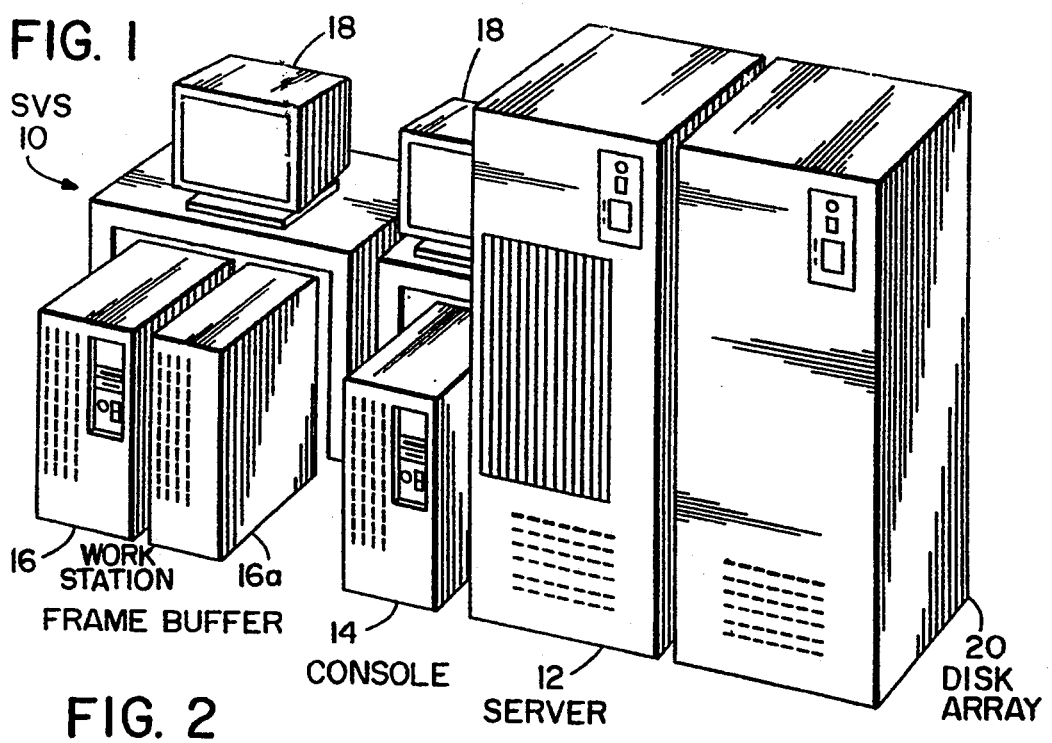
FIG. 1 illustrates system components of a scientific visualization system.

Referring to FIG. 1 there is illustrated a multiprocessor system that includes a serial diagnostic bus and controller that is constructed and operated in accordance with the invention. Specifically, there are illustrated components of a Scientific Visualization System (SVS) 10. A purpose of the SVS 10 is to process, manipulate, and visualize complex data sets at interactive speeds, although the use of the system 10 is not limited to only this one important application. Furthermore, and as will become apparent, the use of the processor interface of the invention is not restricted to only this particular system. That is, the processor interface as taught by the invention may be employed to advantage in a number of different types of multiprocessor systems.

The SVS 10 includes several major components. A first component is a server 12 embodied within a data processing system that provides large-scale computational power, high-speed memory, and intelligent I/O processors, all of which are interconnected by a high speed global bus. The terms global bus, shared bus, and common interconnect are used interchangeably herein.

A second component is a console processor 14 embodied in, by example, a RISC System/6000 (RS/6000) workstation manufactured by the International Business Machines Corporation (RISC System/6000 is a Trademark of the International Business Machines Corporation). The console 14 provides network access from remote workstations (not shown) and interfaces with the serial diagnostic controller of the invention in a manner described below.

A third component is a Frame buffer 16 that includes, by example, an RS/6000 workstation that provides console functions therefor. The frame buffer 16 includes interface and image buffering hardware 16a attached via an ANSI standard High Performance Parallel Interface (HIPPI) interface for providing real-time display capability to high-resolution displays 18. A further component of the system 10 is a disk array 20. The disk array 20 may be embodied within a storage system having 21 GByte capacity with 55 MByte/second transfer rate via a HIPPI interface.

It should be realized that the exact configuration of the system 10 varies depending on the intended use and that the configuration of FIG. 1 is not intended to represent a limitation upon the practice of the invention.

Figure 2:
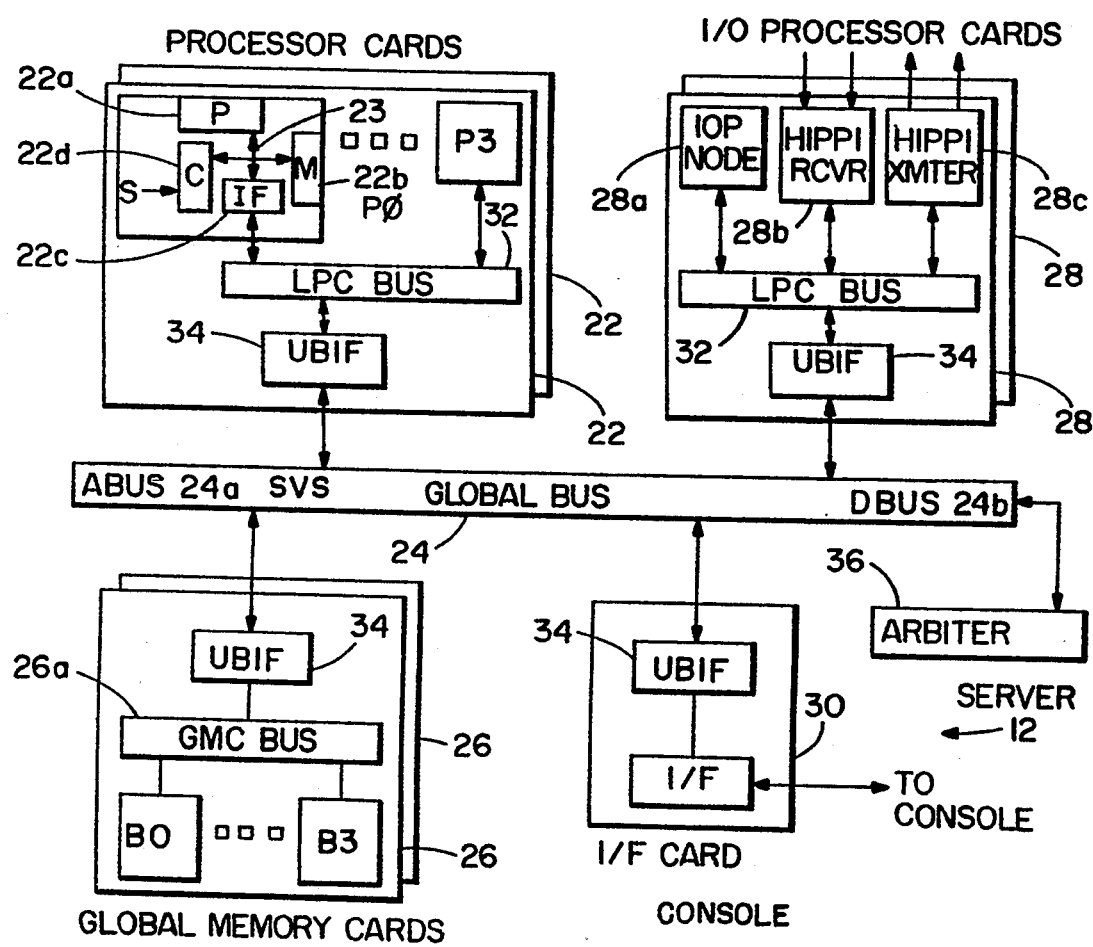
FIG. 2 is a block diagram of the system server component of FIG. 1.

Referring to FIG. 2 there is illustrated in block diagram form the server 12 of the SVS 10. Server 12 is comprised of a plurality of individual processors 22a organized as four processors (P1–P4) per printed circuit card 22. The server 12 may include up to eight cards for a total of 32 processors. Each processor card 22 includes a universal bus interface (UBIF) 34 for coupling a Local Processor Card (LPC) bus 32 to an SVS global bus 24. Also coupled to the SVS global bus 24 are a plurality of Global Memory cards 26, a plurality of I/O processor cards 28, and an interface 30 to the RS/6000 console 14.

Figure 3:
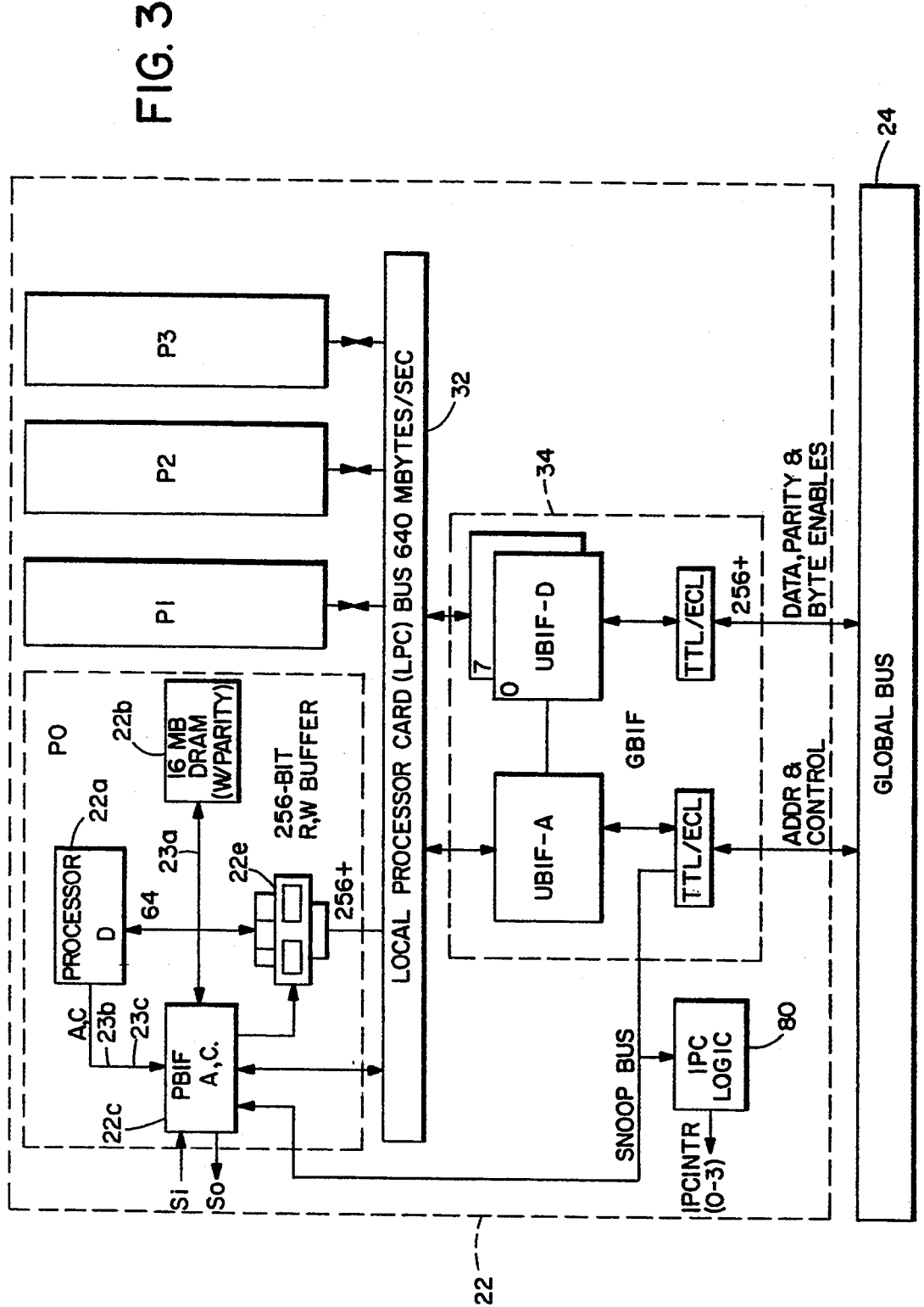
FIG. 3 is a block diagram showing in greater detail a card containing four processor nodes.

As seen in the block diagram of FIG. 3, each processor card 22 includes up to four processor nodes each having a microprocessor 22a. In a present embodiment each microprocessor 22a is an i860-type device, specifically an 80860 microprocessor device manufactured by Intel Corporation (i860 is a Trademark of the Intel Corporation). Coupled to each microprocessor 22a through a local node bus 23, comprised of a local node data bus 23a, a local node address bus 23b, and a local node control bus 23c, is a local node memory 22b providing, in this embodiment, 16 megabytes (MB) of storage. Each processor node also includes, in accordance with the invention, a Processor Buffered Interface (PBIF) 22c, which incorporates an interface to the LPC bus 32. Additionally, each processor node includes an interface 22d (seen in FIG. 2) to a serial bus (S). The LPC bus 32 connects multiple processor nodes to the UBIF 34 and also permits access to further shared resources.

In a present embodiment one of the processor cards 22 is capable of a peak performance of 160 million instructions per second (MIPS), or 320 million single precision floating point operations per second (MFLOPS). A fully configured system of eight processor cards 22 provides a peak performance approaching 1.28 billion instructions per second (BIPS) or 2.56 GFLOPS, assuming 40 MHz operation.

In a present embodiment each of the Global Memory cards 26 is configured with either 128 MB or 256 MB of random access memory with error correction logic. The server 12 may include up to four Global Memory cards 26. Each of the Global Memory cards 26 provides a data bandwidth of 640 MB/second in a manner that reduces a memory access latency seen by each processor in the system 10. This is accomplished by partitioning the Global Memory on each memory card 26 into four memory banks (B0–B3), each of which is capable of independently performing block read cycles, page mode read or write cycles and random read or write cycles. A Global Memory Card (GMC) bus 26a enables each of the banks (B0–B3) to operate independently, while utilizing common global bus resources.

The I/O processor cards 28 each include a processor node 28a, similar to the processor card 22, plus two HIPPI receivers 28b, and two HIPPI transmitters 28C. Each IOP 28 provides four HIPPI interfaces, each of which is capable of operation at a transfer rate of 100 MB/second. Each IOP 28 includes a dedicated processor node 28a, such as is found on the processor card 22, having a microprocessor coupled to 16MB of local memory. Two receiver channels 28b and two transmitter channels 28c are provided on each IOP 28. The channels may operate independently to deliver 100 Mbytes/second each, or in a paired manner to deliver 200 Mbytes/second.

The HIPPI interfaces are employed to support high speed disk arrays, provide real-time images to HIPPI-attached frame buffers, and realize high speed communication with external devices, such as supercomputers.

The Console interface 30 is partitioned into two cards, one which is found within the server 12 and one which resides in the console 14. The link between the two card allows access to the SVS server global memory and serial bus, which in turn allows access to each processor's local memory and PBIF.

The system 10 also includes an Arbiter 36 that is coupled to the Global Bus 24 and which operates to arbitrate requests for the Global Bus between the processors 22, the memory 26, console interface 30, and the I/O processors 28.

The Global Bus 24 is implemented with Emitter Coupled Logic (ECL) technology for interconnecting these various components and providing a 1.28 GB/sec transfer rate. Appendix A describes the various Global Bus 24 signal lines. Major signal groups of the Global Bus 24 include a 32-bit address bus (ABUS) 24a, a 256-bit data bus (DBUS) 24b, and a control bus.

Each SVS 10 server 12 supports up to 12 master devices (i.e. processor cards 22, I/O processor cards 28, or Interface card 30), and up to four memory cards 26 one configuration includes an Interface card 30, eight processor cards 22 (or 32 processors), four Global Memory cards 26 each with 256 MBytes of storage for a total of 1024 MB of high speed memory, and one I/O processor 28 to support the high speed disk array 20, receive data from a HIPPI source, and distribute image data to HIPPI attached frame buffers 16. The console 14 provides a user interface to the SVS 10 as well as support for standard I/O devices.

As can be seen in FIGS. 2 and 3 each component card of the system 10 includes one of the UBIFs 34. The UBIF 34 presents a shared, synchronous, decoupled interface to the Global Bus 24, provides local arbitration on the LPC bus 32 or GMC bus 26a, and performs all necessary handshaking and retry sequencing with the Global bus 24. In a present embodiment the UBIF 34 provides bidirectional, pipelined buffering to support up to four local master devices, such as processors 22a, or up to four slave devices, such as the memory banks B1–B4. The UBIF 34 supports data bus widths between eight bits and 256 bits and provides a peak data transfer rate of 1.28 Gbytes/second between the Local Bus 32 and the Global Bus 24, assuming 40 MHz bus operation (25 nanosecond bus cycle).

Figure 4:
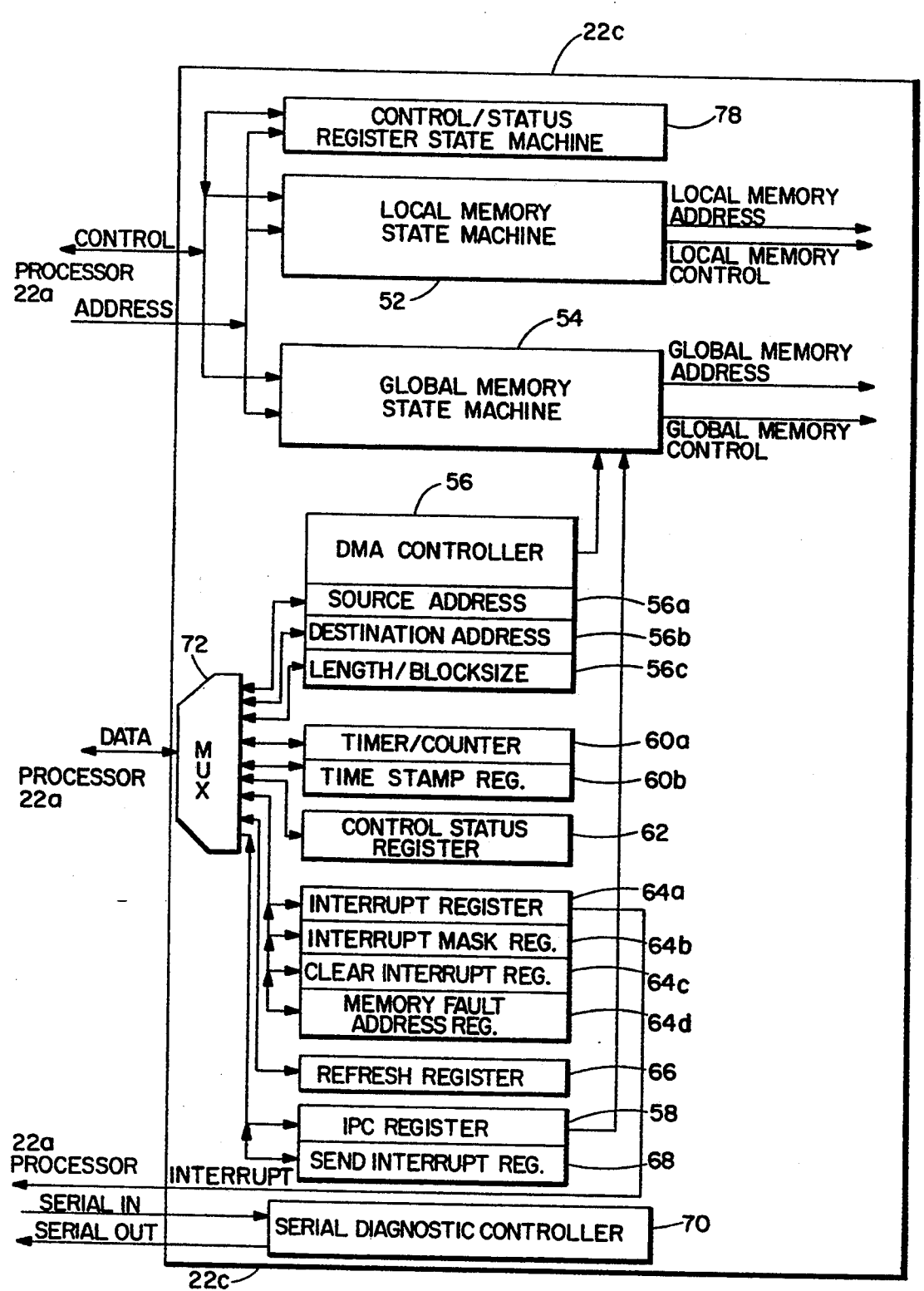
FIG. 4 is a simplified block diagram showing the registers of the processor buffered interface of the invention.
Figure 5:
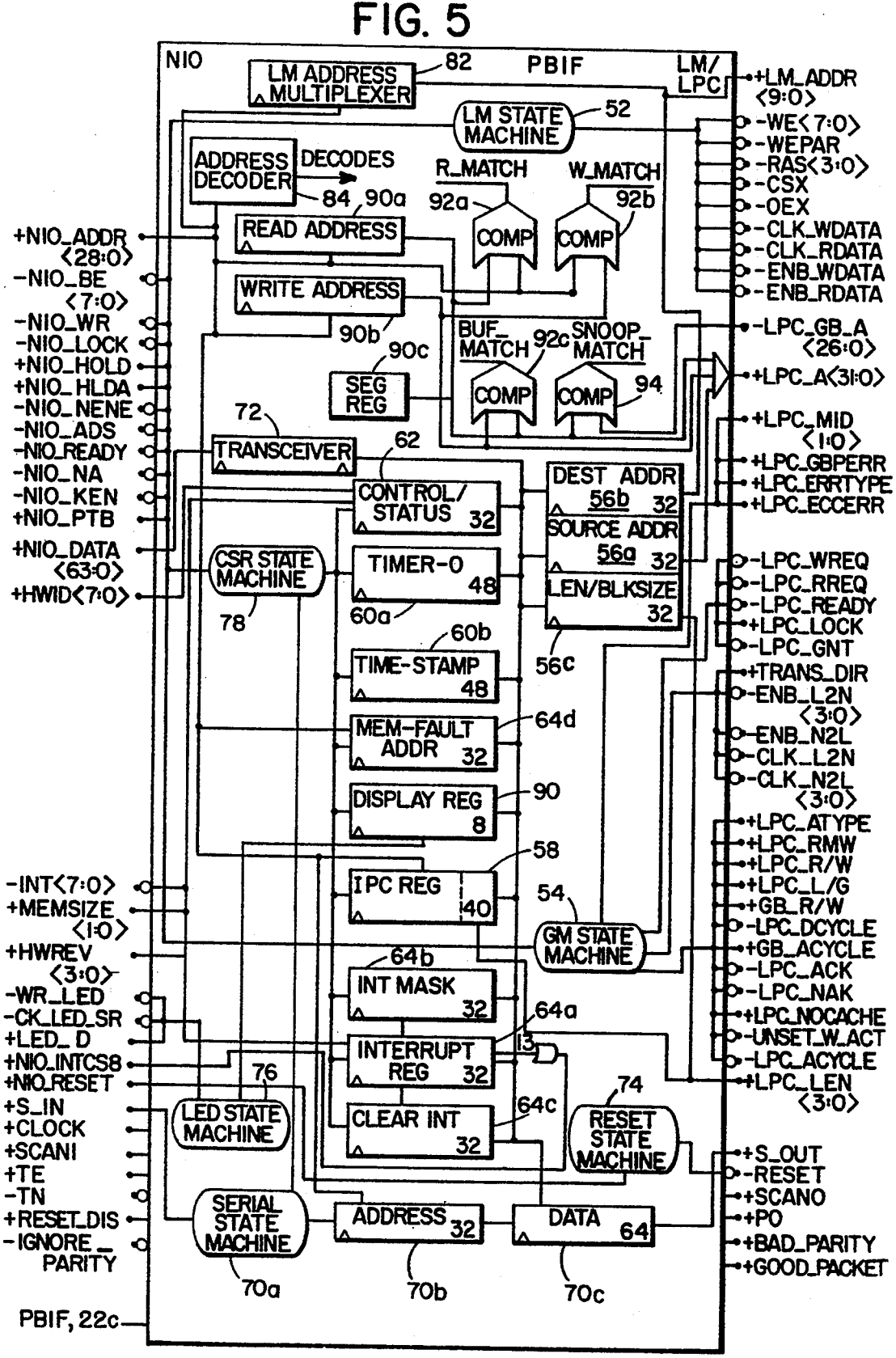
FIG. 5 is a simplified block diagram of the processor buffered interface.

Referring to the block diagrams of FIGS. 4 and 5 there is now described a presently preferred embodiment of the Processor Buffered Interface (PBIF) 22c. The PBIF 22c functions as an interface and a control device for the associated computational processor 22a or I/O processor 28a. The PBIF 22c provides all of the required logic, with the exception of tranceivers and memory, to interface a high performance microprocessor to a high performance multi-processor system. Although the ensuing description is made primarily with respect to the computational processors 22a, it should be realized that the PBIF 22c functions in an identical manner with each of the I/O processors 28a.

The PBIF 22c architecture is implemented as a set of discrete data registers together with an Application Specific Integrated Circuit (ASIC). The PBIF 22c provides the following functions to each processor in the SVS 10.

Local Memory 22b Interface: Each PBIF 22c provides control and address generation for up to 32 MBytes of local memory 22b.

Global Memory 26 Interface: Each PBIF 22c provides control signals to an external 256-bit wide read and write buffer 22e to cache Global Memory 26 operations.

Interrupt Control: Each PBIF 22c provides support for up to eight externally generated interrupts and eight internally generated interrupts.

Inter-Processor Interrupt Capability: Each PBIF 22c provides support for an inter-processor interrupt mechanism whereby a processor in the system can interrupt any other processor (or group of processors).

Direct Memory Access (DMA) Functions: Each PBIF 22c provides a means of transferring data at high speed between the Global Memory 26 and the associated Local Memory 22b using direct memory access cycles.

Miscellaneous Functions: Each PBIF 22c incorporates a Control and Status Register (CSR), two programmable timer/counters, logic to reset the associated processor 22a or 28a, and other functions, as will be described.

Serial Diagnostic Bus Interface: Each PBIF 22c includes circuitry that works in concert with a serial diagnostic bus, as described in copending and commonly assigned U.S. patent application Ser. No. 07/733,767, filed Jul. 22, 1991, entitled "A Serial Diagnostic Interface Bus for Multiprocessor Systems", still pending.

A block diagram of the PBIF 22c, showing the partitioning of the device into these functional blocks, is shown in FIG. 4.

PBIF 22c includes a plurality of state machines, including a Control/Status Register (CSR) state machine 78, a local memory state machine 52, and a global memory state machine 54. These three state machines have inputs connected to the control and address signal lines of the attached processor 22a or 28a. In addition, the global memory state machine 54 receives an input from a DMA controller 56 and an interprocessor communication (IPC) register 58. The local memory state machine 52 generates local memory address and control signal lines that are coupled to the local memory 22b for controlling accesses thereto. The global memory state machine 54 generates global memory address and control signal lines that are coupled via the local processor bus 32 and the UBIF 34 to the global bus 24. The global memory state machine 54 generates global memory address and control signals in response to the local processor 22a or 28a or in response to the operation of the DMA controller 56 or the IPC register 58.

The DMA controller 56 further includes a source address register 56a, a destination address register 56b, and a length/blocksize register 56c. These registers are loaded by the attached processor for controlling DMA operations. The source address register 56a is initially loaded with the memory address from which data is to be read, the destination address register 56b is initially loaded with the address to which the data is to be stored, and the length/blocksize register 56c is initially loaded with a value representing a number of data units that are to be transferred during a DMA operation.

PBIF 22c also includes a timer/counter register 60a and a time stamp register 60b. The PBIF 22c also includes a control status register 62, the operation of which is described in further detail below.

The PBIF 22c includes a block of interrupt-related registers. These include an interrupt register 64a which latches incoming interrupts and then, in turn, interrupts the processor 22a, as appropriate. The PBIF 22c further includes an interrupt mask register 64b, a clear interrupt register 64c, and a memory fault address register 64d. A refresh register 66 is provided for controlling the refresh timing parameters for the local memory 22b DRAMs. The aforementioned IPC register 58 has an associated send interrupt register 68. The serial diagnostic controller 70 is described in the aforementioned commonly assigned U.S. patent application Ser. No. 07/733,767, filed Jul. 22, 1991, entitled "A Serial Diagnostic Interface Bus for Multiprocessor Systems", by A. Garcia et al., still pending.

The aforementioned registers 56 through 68 are all bidirectionally coupled to the local processor through a data multiplexer 72 such that the local processor is enabled to store information within and read information from these registers.

FIG. 5 shows in greater detail the construction of the PBIF 22c and also shows in greater detail the input and output signal lines. Specifically, the outputs of the local memory state machine 52 and the global memory state machine 54 are shown in greater detail. The block diagram of FIG. 5 also shows several other state machines including a reset state machine 74, a LED state machine 76, and the CSR state machine 78. The serial diagnostic controller 70 can be seen to include a serial state machine 70a, an address register 70b and a data register 70c all of which are connected in series and have an output connected to a serial out signal line that is threaded through each of the PBIFs within the system 10.

A further description of the operation of the PBIF 22c is gained from the description of the signal lines shown in Appendix B. Each signal name is defined as an input (-I), output (-O), or bidirectional signal (I/O). A prepended plus (+) indicates an active high signal, and a prepended minus (-) indicates an active low signal. The signal names, as described in Appendix A, appear in the same order as in FIG. 5, reading from the top left going down and then from the bottom right going up. In Appendix A, references to "i860" and "processor" indicate the processors 22a and 28a, and references to "chip" indicate the ASIC within which the PBIF 22c is embodied.

Figure 6:
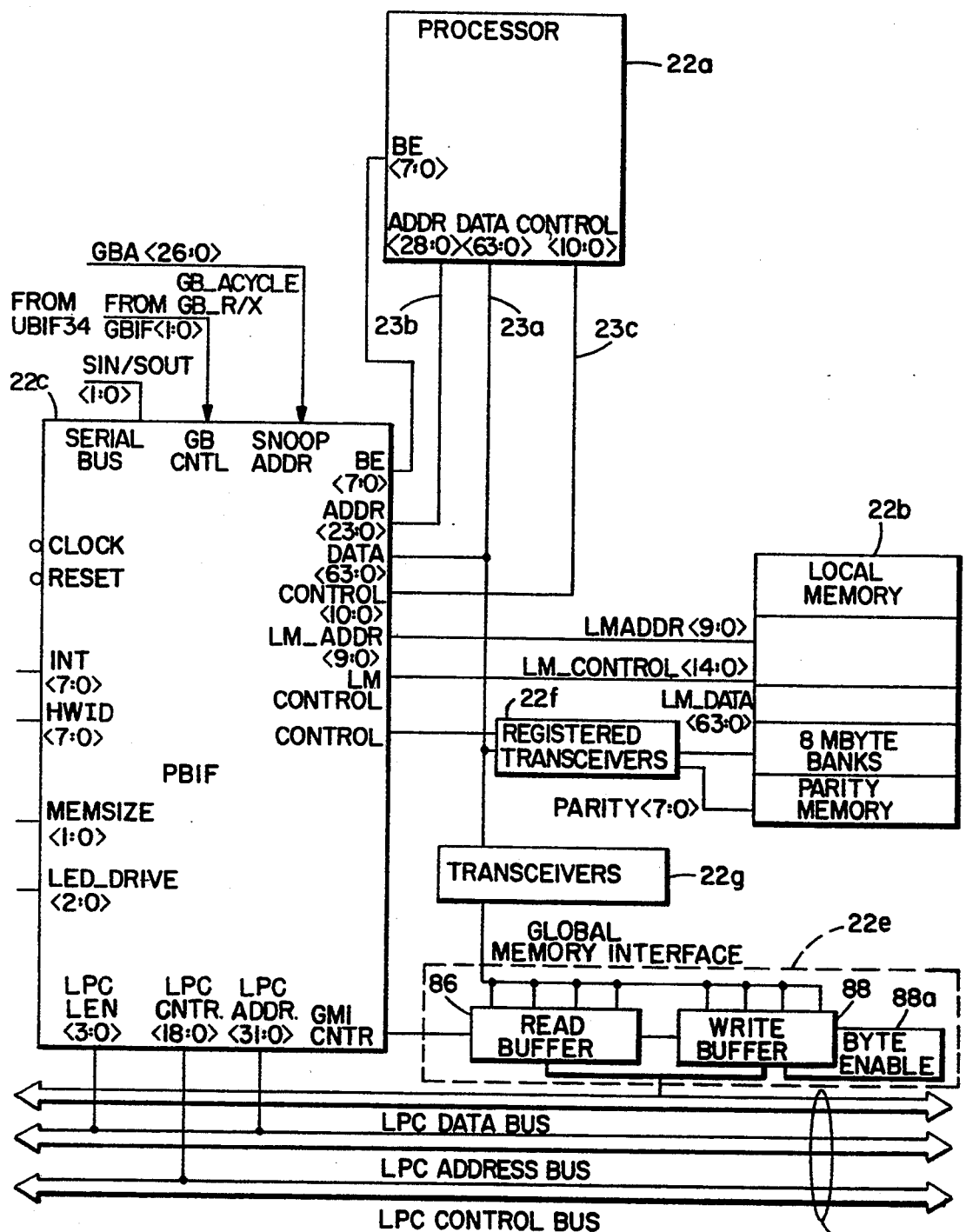
FIG. 6 is a block diagram showing a local processor node and the interconnectivity of the local processor, the processor buffered interface, a local, private memory, and a global memory interface.

FIG. 6 shows in greater detail the interconnection, within a local processor node, of the PBIF 22c to the local processor 22a (or 28a), the local memory 22b, the global memory interface 22e, and the local bus 32. As can be seen, the local memory 22b is partitioned into 8 Mbyte banks and also includes a parity memory section for storing parity memory information associated with each of the memory banks. A set of eight registered transceivers 22f is employed for bidirectionally interfacing the memory banks and parity memory to the local node 64-bit data bus 23a. A set of eight transceivers 22g bidirectionally couple the local node data bus 23a to the read and write buffers of the global memory interface 22e.

Figure 7:
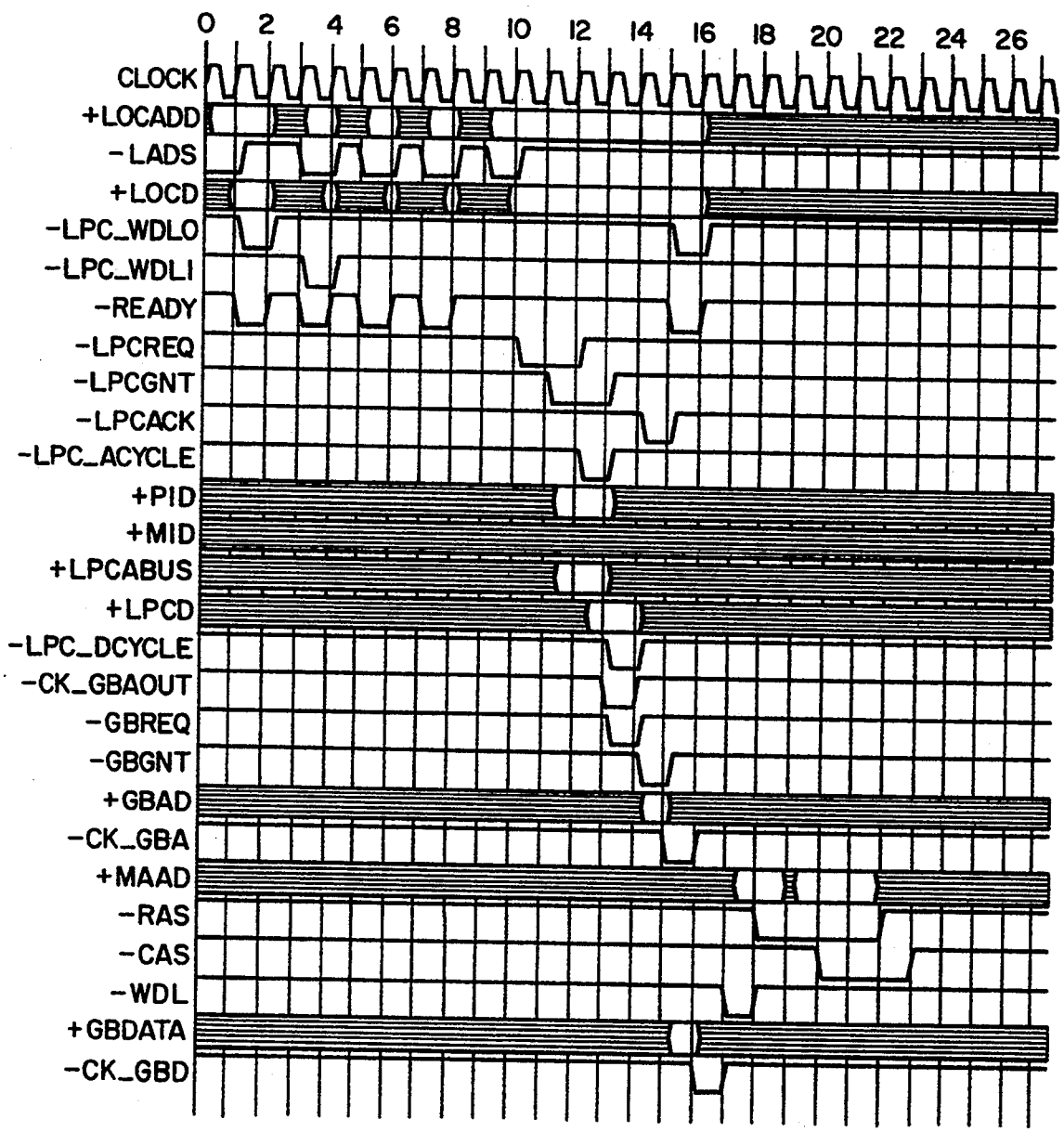
FIG. 7 is a timing diagram illustrating global memory write timing.

FIG. 7 is a timing diagram showing the global memory 26 write timing that is generated by the global memory state machine 54. Signal names shown in FIG. 7 correspond to the signal designations of FIG. 5 and are described in Appendix B. Global Bus 24 signal designators are described in Appendix A. LPC bus 32 signal designators are described in Appendix C.

Figure 8:
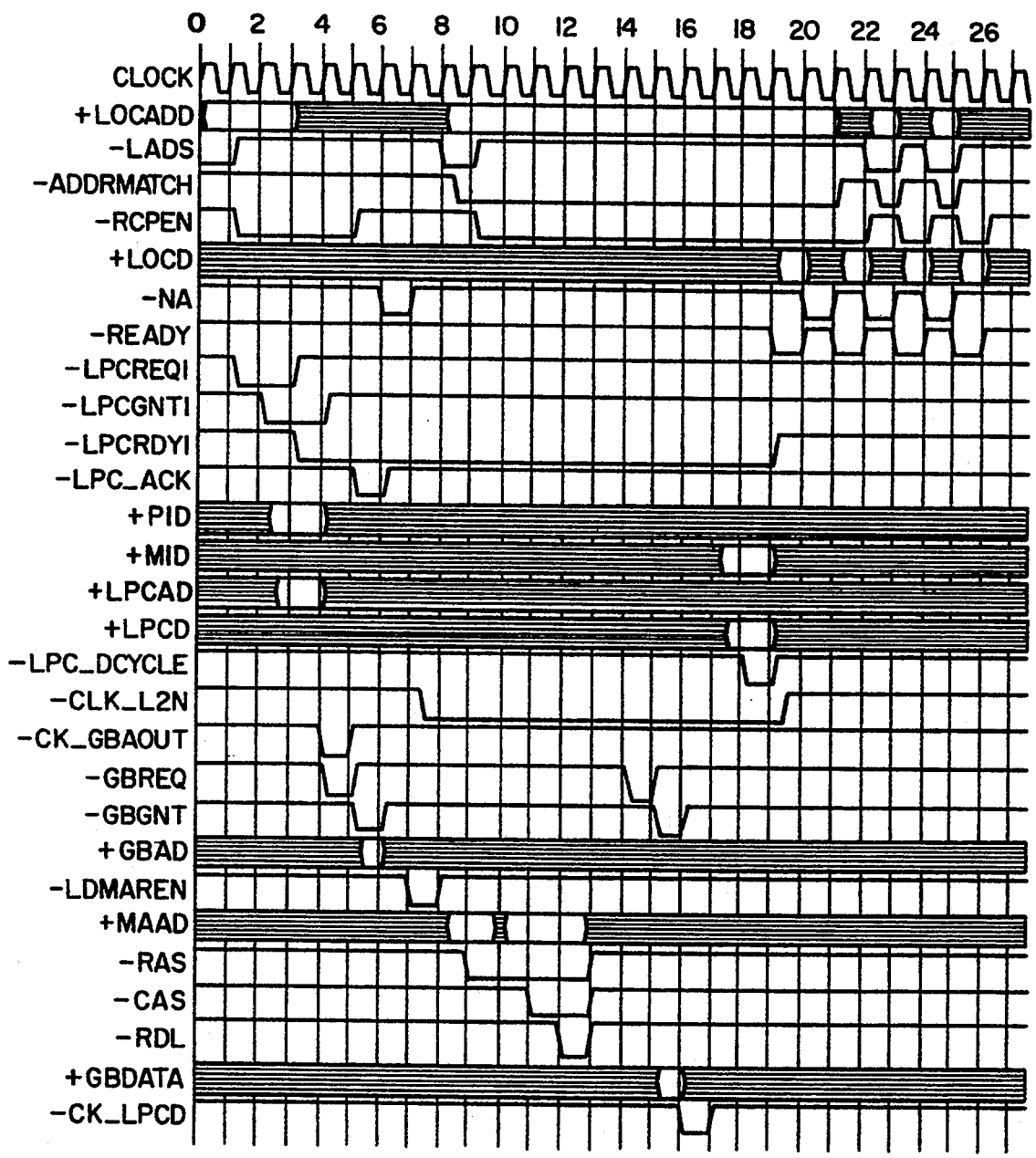
FIG. 8 is a timing diagram illustrating global memory read timing.

FIG. 8 is a timing diagram that depicts global memory 26 read timing that is generated by the global memory state machine 54. It should be noted that the global memory read and write timing includes local memory 22b signal generation, as provided by the local memory state machine 52, and local bus 32 signal generation.

The operation of the global memory state machine 54 is described in detail below.

Figure 9:
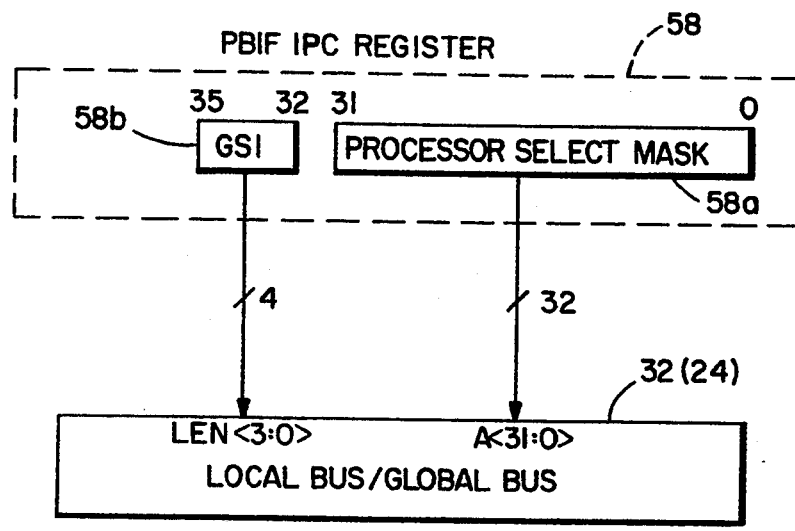
FIG. 9 shows an interprocessor communication register format and the coupling of the interprocessor communication register to the local bus/global bus.
Figure 10:
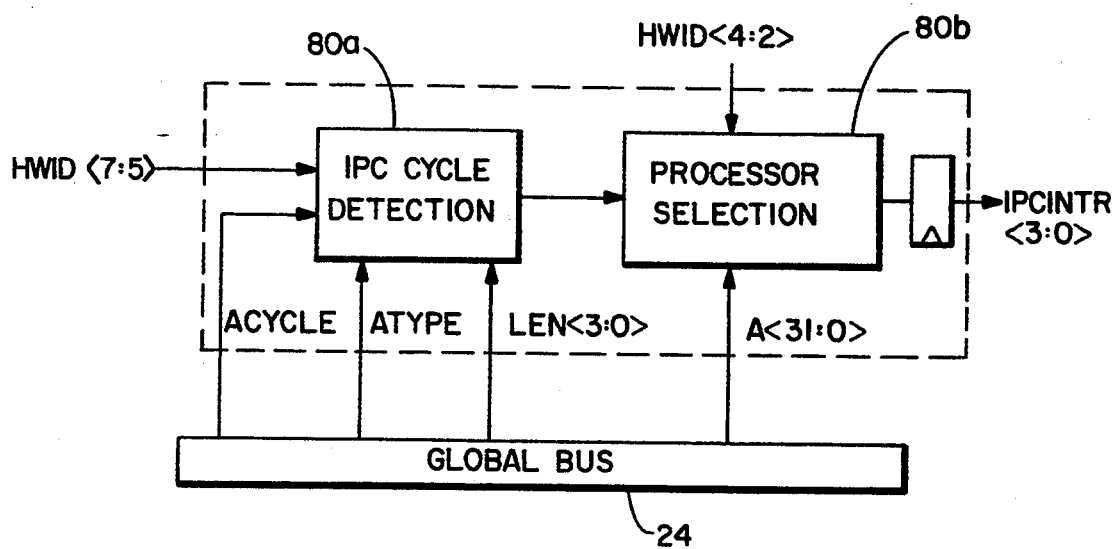
FIG. 10 is a block diagram depicting interprocessor communication logic, embodied within the global bus interface, that receives and decodes the interprocessor communication interrupt message that is generated by the logic of FIG. 9.

FIGS. 9 and 10 show in greater detail the operation of the IPC portion of the PBIF 22c. Specifically, FIG. 9 shows the IPC register 58 format and the coupling of the IPC register 58 to the local bus 32 and to the global bus 24. FIG. 10 shows in greater detail the IPC logic 80, particularly an IPC cycle detection logic block 80a and an IPC processor selection logic block 80b.

As was previously stated, the PBIF 22c provides all of the required logic, with the exception of tranceivers and memory, to interface a high performance microprocessor to a high performance multi-processor system. These functions are now described in greater detail below.

Local Memory Interface

The local memory 22b interface includes an address multiplexer 82 that provides both the address multiplexing for row and column addresses, and also the the local memory state machine 52 that generates control signals required to interface to up to 32 MBytes of local memory 22b. This capability is based on the number of multiplexed address lines which this particular implementation of the PBIF 22c generates. Other embodiments may provide access to more or less than 32 MBytes of local memory.

The PBIF 22c also provides a programmable refresh rate for the local memory 22b. The refresh register 66 is written with a divisor that is applied to the system clock. The resulting divided clock is used to periodically generate refresh cycles. Any refresh request is queued until all currently executing memory cycles are complete. The pending refresh request then has priority over any new cycles requested by the processor 22a. Local memory 22b re fresh occurs unhindered if the processor 22a is accessing another range in memory (such as Global Memory 26).

Global Memory Interface

The processor 22a, for this embodiment of the invention, includes an internal 8 KB data cache and a 4 KB instruction cache having cache lines that are 256-bits in width, and an external data bus that is 64 bits in width. The width of the internal cache line coincides with the width of the Global Data Bus (DBUS 24b), although the width of the processor 22a data bus is a factor of four less than that of DBUS 24b. The two external 256-bit registers 22e provide data bus width matching, and also provide an external, one line, level two cache for the processor 22a.

In accordance with an aspect of the invention, when the processor 22a issues a read to a Global Memory 26 location, the address is decoded within the PBIF 22c by address decode block 84 and the relevant request lines to the UBIF 34 (which controls the Global Bus 24) are generated. When granted a bus cycle by the UBIF 34, the PBIF 22c drives the address onto the LPC bus 32, along with any necessary control lines. The PBIF 22c then "snoops" the local bus 32, waiting for the Global Memory 26 data to be returned. A unique processor ID field, associated with the processor that made the read request, in conjunction with a data valid line on the local bus 32, define the data return condition. When data is returned to an identified processor from the Global Memory 26, the PBIF 22c generates control signals to latch the returned data into the external read buffer 86, and then enables the appropriate word (64-bits) back to the identified processor 22a via the local node data bus 23a. If the processor 22a follows the first request with another request to a 64-bit word, which is also encached within the 256-bit read buffer 86, the second 64-bit word is returned to the processor 22a from the read buffer 86 with minimal latency, and without utilizing any bus bandwidth on either of the shared busses (LPC 32 and GB 24).

The global memory state machine 54 is optimized to support cache reloads, where consecutive words are loaded into the processor 22a. After the initial latency for the first Global Memory 26 read, all subsequent words are returned in two bus cycles. Various address comparison functions are performed within the PBIF 22c with registers 90a and 90b and comparators 92a, 92b, 92c, and 94. Registers 90a and 90b maintain a record of the addresses of words that are currently stored in the external buffers 22e. If an out-of-sequence read is requested from the buffer 86 (i.e. the least significant 64-bits followed by the most significant 64-bits), an additional cycle is allowed for bus turnaround, and the read requires three cycles to complete. Reference is again made to the timing diagrams for Global Memory 26 reads (FIG. 8) and writes (FIG. 7).

The contents of the read buffer 86 are invalidated if the processor 22a requests a word which is not currently cached, or if the currently cached word is detected as being written on the Global Bus 24. The PBIF 22c snoops all bus cycles on the Global Bus 24 to determine if a write takes place to a location in Global Memory 26 which is currently encached within the associated read buffer 86. This snooping function is accomplished with comparator 94. In addition, some conditions result in an invalidation of the read buffer 86. For example, a read from the processor 22a, with N10_LOCK active, invalidates the current contents of the read buffer 86, and the data is instead fetched from GM 26. However, this condition may be disabled via a Control Status Register 62 bit. Another signal line (LP_C-NOCACHE) on the local bus 32 enables external devices to signal that they are returning non-cacheable data. Also, if a processor 22a writes the same address as is currently cached for reads, the read buffer 86 is invalidated. Furthermore, as a fail safe mechanism, the read buffer 86 may be automatically invalidated by the PBIF 22c after 256 reads of the same encached data, without a read buffer 86 reload from Global Memory 26. This feature is controlled by a bit in the CSR 62. The combination of these features ensures that any data stored within the read buffer 86 remains consistent with the copy stored within Global Memory 26.

If data is returned from Global Memory 26 with an ECC (Error Check and Correction) error condition set, indicating that when the data was read the Global memory 26 detected an ECC error, the data is returned to the processor 22a, but is not be cached in the read buffer 86, and an interrupt is generated by the PBIF 22c to the processor 22a.

The write buffer 88 operates in a similar fashion. When the processor 22a writes a word to a Global Memory 26 location, it is cached in the write buffer 88. Any further writes within the same 256-bits are stored within the write buffer 88. The write buffer 88 circuitry includes a register 88b for storing processor 22a byte enables, and updates these buffered write enables as appropriate. If the processor 22a writes to a location that is not currently cached in the write buffer 88 the contents of the write buffer 88 are flushed out to Global Memory 26, with the PBIF 22c generating the appropriate control signals, and the newly written word replaces the old within the write buffer 88. In addition, a software-controllable mode enables the write buffer 88 to be written out to Global Memory 26 after all 32 bytes have been written by the associated processor 22a.

The write buffer 88 is also flushed if the processor 22a issues a locked write to Global Memory 26. A locked write is a special type of write cycle which the processor 22a may execute. During locked memory cycles, only the processor which initiated the lock is allowed to alter the data which it locked. This ensures consistency in multiprocessor systems, where many processors may attempt to Share the same data. The processor 22a indicates a locked cycle by enabling a special output pin (N10_LOCK) during the cycle. If a locked write is requested to Global Memory 26, this condition first flushes the present contents of the write buffer 88, so as to maintain order, and then writes the locked word without buffering it. This operation is similar to that previously described for locked reads. Also, as was previously stated, a read of a Global Memory 26 address which is currently buffered in the write buffer 88 causes the write buffer 88 to be flushed before the read request is issued. This ensures that if the copy of the data in the write buffer 88 is more current than that contained within the Global Memory 26, that the most current version is returned to the requesting processor.

As a safety feature, the PBIF 22c also implements timeout mechanisms for all shared bus accesses. In addition, in that the 32-bit local bus address corresponds to a 256-bit data address, the most significant five address bits are programmable, via a segment register in the PBIF 22c, to allow 128 Gbytes of Global Memory 26 to be addressed.

Interrupt Control

The PBIF 22c supports up to eight external, level-sensitive interrupts and eight internally generated interrupts. The interrupts are individually maskable through the interrupt mask register 64b, and individually clearable through the clear interrupt register 64c. Any active, non-masked interrupts are OR'd together and passed through to the single interrupt input pin of the processor 22a. The Memory Fault Address Register (MFAR) 64d stores the last three addresses accessed by the processor 22a, and in the event of a parity, ECC or bus error interrupt, enables the failing address to be read.

Whereas the eight external interrupts may be connected as required by the particular implementation, the following internal interrupts are currently implemented.

Timer/Counter Interrupt. This interrupt is set after the timer/counter 60a is initialized to a starting value and subsequently decrements to zero.

Bad Address. This interrupt is set when the PBIF 22c receives a request from the processor 22a to an address which is not mapped.

Diagnostic Interrupt. This interrupt is set when the PBIF 22c receives an interrupt packet over the serial diagnostic interface bus.

Buserror Interrupt. This interrupt is set when the PBIF 22c times out while attempting to access the local bus 32.

End Of DMA Interrupt. This interrupt is set at the completion of a DMA operation.

In addition, two pins (+LPC_ECCERR−I and +LPC_ERRTYPE−I) are implemented on the PBIF 22c and are used as interrupt inputs for indicating ECC errors returned with data read from Global Memory 26.

Inter-processor Interrupt (IPC) Support

The PBIF 22c contains two registers 58 and 68 which support the sending of inter-processor interrupts. The IPC register 58 is differentiated into a Processor Select Mask register 58a and a GSI register 58b. The Processor Select Mask register 58a (FIG. 9) defines a destination mask and has a width of 32-bits, with each bit being associated with one of the system 10 processors. This enables a processor to send an interrupt to any one processor, or group of processors, within the system. An additional four bits stored within the GSI register 58b select a destination system unit, or the type of processor (computation or I/O). The second register is the Send Interrupt Register 68 (FIG. 4) which controls the dispatch of the interrupt. A processor may also interrupt itself via this mechanism.

The IPC interrupt is performed as a special local bus 32 cycle. Specifically, the PBIF 22c sends an IPC interrupt message as a special read cycle that is differentiated from a normal read cycle by means of an extra pin on the local bus, LPC_ATYPE. This special local bus read cycle is passed through to the Global Bus 24 by the associated UBIF 34, and is decoded (FIG. 10) by the UBIF on any card which has its specific identifier set in the destination field. The LPC bus address lines, LPC_A(31:0), are used to convey the 32-bit processor 22a mask, and the length field, LPC_LEN(3:0), is used to convey the additional descriptor information. The UBIF 34 on any card which decodes a valid bit in the destination field generates the signal IPCINTR<3:0> to interrupt the relevant processor(s).

DMA Functions The PBIF 22c supports Block DMA between the Global Memory 26 and the associated local memory 22b by means of the source address register 56a, the destination address register 56b, and the length/blocksize register 56c. In that the Global bus 24 supports block data transfers, both the size of the blocks to be transferred and the number of blocks are specified. Returned data blocks are stored in the UBIF 34 until requested by the PBIF 22c. In a presently preferred UBIF 34 implementation, eight 256-bit words may be stored per processor 22a. From the UBIF 34 the DMA data is written into the Global Memory 26 read buffer 86, before being transferred to the local memory 22b data transceivers 22f and 22g 64-bits at a time. In operation, the DMA controller writes the local memory 22b at its full bandwidth, accommodates local memory 22b refresh during DMA operations, and also requests ahead on the local bus 32 for the next 256-bit word from Global Memory 26 so as to minimize any latency. The PBIF 22c holds the processor 22a off the local bus 32 whilst DMA operations are taking place, and enables transfers to be achieved at up to 80 MBytes/second, assuming no contention on the Global Bus 24. An end of DMA interrupt signals completion of the operation.

Miscellaneous Functions

The Control and Status Register (CSR) 62 controls numerous functions within the PBIF 22c, including setting a mode for read buffer 86 and write buffer 88 operation. The CSR 62 is a 32-bit register containing some bits which are read/write (r/w), some bits that are read-only (r/o), and other bits that are write-only (w/o). The CSR 62 bit definitions follow.

A (r/w) bit enables the write buffer 88 autoflush mode. When set to one, this bit allows the PBIF 22c write buffer 88 to be automatically flushed out to Global Memory 26 when all 32 bytes have been written by the local processor 22a. When cleared to zero (default), the PBIF 22c write buffer 88 is flushed only (a) when the associated processor's global write address is outside of the active 32-byte write block, (b) when the processor 22a issues a read to an address contained in the active 32-byte write block, or (c) when the processor 22a issues a LOCK write cycle to Global Memory 26.

A (r/w) bit enables read buffer 86 auto-invalidate mode. When set to one, this bit enables the PBIF 22c read buffer 86 to be invalidated after 256 consecutive processor 22a reads to the same 32-byte Global Memory 26 address.

A (r/w) bit enables the read buffer 86. When set to one, this bit enables buffered reads from the PBIF 22c read data buffer, which holds up to 32 consecutive bytes aligned on 32-byte global address boundaries. When cleared to zero (default), the PBIF 22c reflects every processor 22a read to the global address space on the LPC bus and Global Bus 24. That is, all reads come from GM 26, and not from date previously stored in the read buffer 86.

A(r/w) bit enables the write buffer 88. When set to one, this bit enables processor writes to be buffered within the write data buffer 88, which holds up to 32 consecutive bytes aligned on 32-byte global address boundaries. When cleared to zero (default), the PBIF 22c reflects every processor 22a write to the global address space on the LPC bus 32 and Global Bus 24, via the write buffer 88.

A(w/o) bit resets a fault condition. When a one is written to this bit location, the current fault condition is cleared and the memory fault address register 64d resumes latching Memory 26 addresses issued by the processor 22a. Whenever a fault condition occurs, the memory fault address register 64d reflects the physical address of the most recent memory reference which caused the error condition.

A(r/w) bit functions as a timer mode select. When set to one, the interrupt timer 60a continuously decrements from an initial value, generates a processor 22a interrupt, and resets to its initial value. When cleared to zero (default), the timer 60a decrements from its initial value, generates a processor 22a interrupt, and then ceases operation until reloaded by the processor 22a.

Two (r/o) bits are used as local memory size bits and indicate the size of local memory 22b on the processor 22a. With the two bits set to 00, 01, 10, or 11 they indicate 8, 16, 32 or 8 Mbytes, respectively, for the size of the local memory 22b.

Eight (r/o) bits are processor identifier bits. The resulting 8-bit code reflects the unique hardware identifier of the attached processor 22a, which is used to tag processor read requests to the Global Bus 24. The 8-bit code is composed of a 2-bit UNITID, which identifies SVS 10 system units in a closely coupled, multi-SVS configuration, a 4-bit SLOTID, which identifies the backplane slot to which the processor card 22 is connected, and a 2-bit LOC_PROCID, which uniquely identifies the processor 22a number on the processor card 22.

Four (r/o) bits reflect a revision level of the processor card 22.

A(r/w) bit functions as a processor boot bit.

This bit controls whether the processor 22a will boot in 8-bit mode or in 64-bit mode following a reset. The default is the 64-bit mode.

A(r/w) bit specifies a Request (REQ) to Grant (GNT) timeout period. This bit controls if the PBIF 22c will timeout if an LPC_REQ or LPC_WREQ does not receive an LPC_GNT within some predetermined number of cycles. The occurrence of a timeout with this bit enabled sets the BUSERR interrupt to the processor 22a.

Another (r/w) bit is a Read reply timeout bit and controls whether the PBIF will timeout if it is waiting for data to be returned on the LPC bus 32 and does not receive an LPC_DCYCLE signal with an ID_MATCH within some predetermined number of cycles. The occurrence of a timeout with this bit enabled sets the BUSERR interrupt to the processor 22a.

A(r/w) bit is a PTB Enable bit and, if active, determines if the Global Memory state machine 54 responds to the processor +N10_PTB−I signal line. If this signal line is active, and PTB is enabled, and the PBIF 22c does not cache (read or write) the processor 22a global memory request.

A(r/w) bit functions as an ECC Enable bit. If this bit is inactive the PBIF 22c ignores all incoming ECC errors. If this bit is active ECC errors generate interrupts and invalidate the Global Memory 26 read buffer 86 as appropriate.

A further interface provides control from the processor 22a, via the LED state machine 76, of four intelligent alpha-numeric displays (not shown). A serial interface between the PBIF 22c and the displays is implemented to reduce pin count. Writing of any one display element is accomplished by writing a Display register 90 (FIG. 5) with an ASCII character code and an identifier of the display to receive the character.

The reset state machine 74 ensures that the processor 22a is held in reset until all registers in the PBIF 22c are correctly initialized (after power on, for instance). These registers may be initially loaded via the Serial Diagnostics Interface bus from a system console (Host 14).

Serial Diagnostics Interface Bus

The PBIF 22c implements a serial diagnostic bus, which enables a host computer to perform numerous control functions, or to access any part of memory which the local processor 22a can access. Thus, a serial bus master is enabled to read or write global or local memory or any of the registers within the PBIF 22c. In addition, the serial bus master can halt, and subsequently continue, any processor, reboot a processor or a processor node, or send an interrupt to an individual processor or a group of processors. The serial bus thus "mimics" the operation of a processor and in this manner is capable of performing any operation which a processor can perform. These features are described in greater detail in the aforementioned commonly assigned U.S. patent application Ser. No. 07/733,767, filed Jul. 22, 1991, entitled "A Serial Diagnostic Interface Bus for Multiprocessor Systems", by A. Garcia et al.

Global Memory Interface

The operation of the PBIF 22c GM 26 interface is described with reference to the GM 26 state machine 54, illustrated in FIG. 11, and in reference to the GB 24 timing diagrams, illustrated in FIGS. 7 and 8.

Data path performance to the GM 26 is improved, as stated above, by the provision of the 256-bit read buffer 86 and the 256-bit write buffer 88, both of which may be turned selectively enabled or disabled through bits in CSR 62. Buffers 86 and 88 provide bus-width matching between the processor 22a and the LPC bus 32, and also provide posting capability for writes, and increased throughput on pipelined reads. In the case of reads, the contents of the read buffer 86 are invalidated under the following circumstances: (a) a write on the GB 24 to the current read address (snoop match); (b) a GM 26 write request to the current read address; (c) a read to an address different than the current read address; (d) a volatile read (as indicated by +NOCACHE on the LPC bus 32); (e) a read from the processor 22a with the PTB bit set (and enabled in the CSR 62); and (f) auto-flush after 256 reads from the same 32-byte address.

The read buffer 86 is not set as a result of a read request which fails to complete (e.g. timeout), or as a result of a read request which returns bad data (e.g. GM 26 parity or ECC error).

The contents of the write buffer 88 are flushed to the GM 26 under one of four conditions: (a) a condition indicated by the CSR 62 mode bit is met; (b) the performance of a locked write request, which flushes any data currently in the write buffer 88, and then performs the locked write to GM 26; and (c) a read to the address which is currently active in the write buffer 88. In this case the write buffer 88 is flushed before the read request is issued.

There are two write flush modes which may be set under software control. If the above described CSR 62 bit is enabled, then the default mode for operation is to flush the write buffer 88 contents whenever the write buffer 88 contains valid data, and the processor 22a writes to a different address in the GM 26. In the second mode, the contents of the write buffer 88 are flushed whenever all 32 bytes of the 256 bit word have been written, as indicated by the byte enables. A register within the GM 26 state machine 54 latches the byte enables whenever a GM 26 write occurs, and when all 32 bits are set, generates a signal −BYTES_FULL, which causes a state machine 54 transition. This register is reset whenever the contents of the write buffer 88 are flushed.

The GM 26 state machine 54 also allows requests to go out onto the LPC bus 32 for other local devices. In this case, the GM 26 operation is initiated by an IO address decode rather than a GM 26 address decode by address decoder 84.

Buffers and Comparators

As well as providing the read buffer 86 and the write buffer 88 for the data path, the LPC bus 32 interface also provides the address buffers 90a and 90b. Buffer 90a stores the address of the current read buffer 86, and is enabled onto the LPC bus 32 during a read cycle. Buffer 90b stores the current write address. Two buffers are required so that if the processor 22a writes a 64-bit word, and then proceeds to read in a cache line before writing the rest of the 256 bits (and flushing the write buffer 88), the correct write address is driven to the LPC bus 32 during the write cycle.

Buffers 90a and 90b are implemented as 27-bit registers to hold the GM 26 read buffer 86 and write buffer 88 addresses. These buffers are latched under the control of the GM 26 state machine 54. It is noted that the 27 most significant bits of the GB 24 address bus are driven on the 27 least significant bits of the LPC address bus. Just as the GB 24 address drives 29 address bits (three are ignored because of 64-bit addressing) so the PBIF 22c drives 27 bits (five are ignored because of 256-bit addressing). The top five bits of the LPC address field are set, on all GM 26 (or IOSEL) operations, to a value which is stored in a segment register (SEGREG) 90c. This register is initialized to zero by a reset, and is subsequently written, if required, so as to address a larger GM 26 address space.

In addition, the latched addresses are used as input to a number of comparators. Comparators 92a and 92b compare the buffered read and write addresses, respectively, with the processor 22a address (bits 28-2). Thus, if the read buffer 86 contains the currently active read address, and the processor 22a issues a read request to the same page such that the address bits match, then comparator 92a asserts the signal R_MATCH, and the state machine 54 responds accordingly. A signal W_MATCH is similarly generated by comparator 92b. The third comparator 92c compares the latched read and write addresses. This comparison is performed at the same time as the previous two comparisons. A fourth comparator 94 compares the read address with the snoop address from the LPC bus 32. Finally a fifth comparator (not shown) compares two bits of MID from the LPC bus 32 with hardwired ID to the PBIFc.

It should be noted that, whenever the write buffer 88 is flushed, the contents of the register 88a storing the 32 byte enable signals for the LPC bus 32 is also cleared. Register 88a exists external to the PBIF 22c to drive the LPC bus 32, and exists also as a "shadow" register within the PBIF 22c. Eight-bit portions of register 88a are individually loaded, and the register 88a is cleared with one signal. The stored byte enables, each of which corresponds to one byte in the write buffer 88, are combined to generate the signal LPC_RMW. This line is driven with the LPC bus 32 address on writes and is low if all of the byte enables are set. It is driven high if, for any word-aligned 32-bit slice, not all of the byte enables are set. As an example, if the processor 22a writes a 64-bit word, and all eight byte enables are active, then LPC_RMW is low, if this word is flushed. If two 64-bit words are written to the write buffer 88, and all 16 byte enables are active, then these two words would also be written with LPC_RMW low. If a third word is written to the write buffer 88 and it is then flushed, and if either one of the 32-bit words within this third 64-bit word has an inactive byte enable, then LPC_RMW remains high when the write buffer 88 is flushed. This prevents the inadvertent overwriting of data in GM 26.

Figure 11:
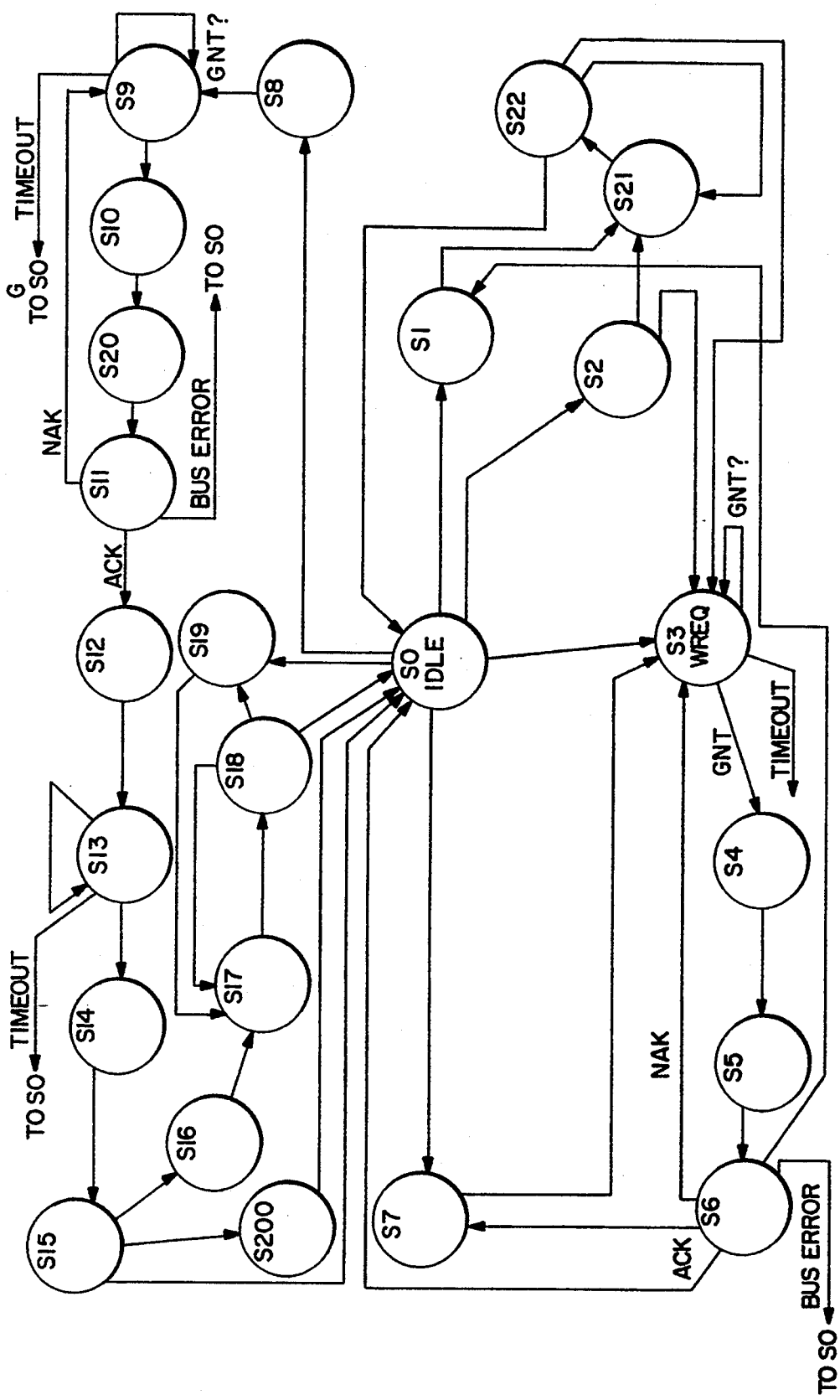
FIG. 11 is a state diagram that depicts the operation of a global memory state machine.

Referring to FIG. 11 the state machine 54 begins in the idle state (S0). A GM 26 write is requested by the processor 22a in the same manner as a local memory write, with the appropriate address decode signalling that this write is to be posted to the GB 24. In the cycle following Address Status from the processor 22a, S1 is entered and READY goes low to the processor 22a, indicating that the data has been written. At the end of this cycle, the data is latched into the Write buffer 88, and the state machine 54 proceeds to state S21. Also latched in state S1 is the read buffer 86 address. The write buffer 88 flag is set active. From state S21, state S22 is entered. If the processor 22a, as a result of the READY asserted in S1, had placed an Address Status and a new address on the address bus 23b during S21, then at the end of S22, this condition is detected and, if there is a read address match (R_MATCH), the state machine 54 loops back to S21. In this case READY is sent to the processor 22a, and another word of data is latched. This is conditional upon S21 following S22. If there is no processor 22a LADS at the end of state S22, and if the write flush conditions have not been met, a return is made to the idle state (S0). A further discussion of write flush conditions follows.

From S0, if the processor 22a issues another write request, and the W_MATCH signal indicates that this write is in the same 256-bit block as the address stored in write buffer 88, then the state machine 54 enters state S2, the data is latched, READY is returned to the processor 22a, and the write address is latched. A write request to any GM 26 location, when the write buffer 88 enable bit is not set, also causes the write to occur in state S2 (rather than S1). At the end of S2, the state machine 54 branches to state S21, unless either the write buffer 88 is disabled, or all 32-bytes of data have been written, in which case a branch is made to S3 to initiate the LPC bus 32 write. In the case of branching to S21, the same procedure is followed as has just been described.

When either a write to an address which does not generate a W_MATCH is detected, or all 32-bytes of the write buffer 88 have been written as indicated by the stored byte enables, the contents of the write buffer 88 are flushed to GM 26. In this case, the state machine 54 branches to state S3, and an LPC write request is issued. This state transition also occurs as a result of a read to the address currently stored in the write buffer 88, which is detected by comparator 92c.

It is noted that the transitions from S0 to S3 or to S7 have precedence over those to S8.

In state S3, an output enable to LPC bus 32 transceivers goes active, and is conditioned by the appearance of a Grant from a LPC bus 32 arbiter. When a GRANT signal from the LPC arbiter is asserted, the address is driven onto the LPC bus 32, and at the end of this cycle, the state machine 54 enters state S4.

It is noted that the LPC_LOCK line is driven active whenever the LPC_ADDR is driven active, and the request is a result of a processor 22a request with N10_LOCK active. The intention is to set the lock bit for all write buffer 88 flushes initiated either by an S0 to S7 transition, or by an S6 to S7 transition (but only if these were caused by locked writes, not PTB writes), or by an S0 to S2 transition which is caused by a locked write with the write buffer 88 disabled. In addition, the lock bit is set by a locked read request. This causes an S0 to S8 transition, so that the data is read from GM 26 and not from the read buffer 86, as would occur on an S0 to S19 transition. In addition, for a locked read, the data is not cached by read buffer 86.

The four LPC bus 32 length lines (LPC_LEN(3:0)) are driven, with the address, to zero for all "normal" GM 26 requests. In S4 the output enables for the data transceivers are active, and the data is driven out onto the LPC bus 32 in this cycle. The address is also driven onto the bus for one additional cycle (a two cycle active period).

Following this cycle, the state machine 54 transitions to state S5, where the data is enabled onto the LPC bus 32 for a second cycle, and the write buffer 88 valid flag is disabled. Following S5, the state machine 54 waits in state S6 until either an ACK or a NAK is received from the associated UBIF 34.

If NAK is received, the state machine 54 branches back to state S3, and a further write request is issued. If an ACK is received, the state machine 54 may branch to one of three states, depending on the condition that caused the write buffer 88 flush.

For a write flush caused by a write to a different address (default mode), the state machine 54 branches to state S1, where the data and address for the new write are latched into the appropriate ones of the buffers 90b and 88, and READY is returned to the processor 22a. The write buffer 88 active flag is also set.

For a write flush caused by a write of all 32 bytes, or by a read to the write address and not followed by any other write, the state machine 54 branches back to the idle state S0, after transferring the contents of the write buffer 88 out onto the LPC bus 32.

For a write flush caused by a locked write to an address different from the current active write address the state machine 54 branches to state S7, where the address and data for the locked write are latched into their respective write buffers. The write buffer 88 active flag is set, and READY is returned to the processor 22a. A branch is made to state S3 to flush the locked write out to the LPC bus 32.

A branch to state S7, directly from the idle state S0, may occur if a locked write request is received and the write buffer 88 is either inactive, or has an address that matches the requested locked write address. In this case the address and data are latched, and the state machine 54 branches to S3 to flush the data. At this point, the write to GM 26 is complete, as far as the processor 22a is concerned.

A processor 22a read from GM 26 is now described. It is assumed that the read buffer 86 is initially empty. When the processor 22a requests a non-volatile read from GM 26, the state machine 54 branches to state S8. In this state an LPC read request is signalled, and the read address is clocked into the read address buffer 90a. From S8 state S9 is entered. The state machine 54 loops at S9, while maintaining the LPC bus 32 read request asserted, until a GNT from the LPC bus 32 arbiter is received. When the GNT is received, the read address is driven during this cycle onto the LPC bus 32, and also in the following cycle.

From S9, the state machine 54 proceeds to state S10 on receipt of a GNT. In state S10, the read address is driven for a second cycle to the LPC bus 32, and a signal line becomes active indicating that the state machine 54 is waiting to receive data. State S20, then S11 is entered, where the state machine 54 loops until either an ACK or a NAK is received. If NAK is received, a transition is made back to state S9 to resend the request. If ACK is received, state S12 is entered.

In state S12, signal Next Address (NA) is asserted to the processor 22a, indicating that it may place a new address on the processor address bus 23b, and the state machine 54 then proceeds to state S13, where it loops until that the requested data from GM 26 is available on the LPC bus 32. While in state S13 the read buffer 86 latches data from the LPC bus 32 every cycle until the correct data appears and state S13 is exited. If the processor 22a has, in the meantime, placed a new address on address bus 23b the address is held by processor 22a until the next acknowledgement from the state machine 54. If this next address is, for example, a read request to local memory 22b, this read does not take place until the GM 26 has finished returning the previously requested read data. This ensures that reads are not returned out of sequence. When a signal ID_MATCH goes active, indicating a memory return for the associated processor 22a, a branch to state S14 occurs. In S14, although the data is active on the LPC bus 32 for another cycle, it is enabled to the processor 22a data bus 23a and READY is asserted to the processor 22a, to indicate that it may latch the returned data at the end of the cycle. In the case of there being no cycle pending for the GM 26, at the end of state S15, the state machine 54 returns to the idle state S0. However, if there is a GM 26 write cycle pending at this point state machine 54 passes through state S200 on the way to S0. State S200 adds an additional wait state to the write, as the processor 22a delays asserting data by one clock on a write cycle following a read cycle. If, however, there is instead a read cycle pending to the same 256 bit word of data, as indicated by R_MATCH from comparater 92a, the state machine 54 branches to state S16. If any other type of request is pending, state machine 54 returns to state S0, and the read buffer 86 valid signal is invalidated.

In state S16, a signal is asserted that indicates to the processor 22a that it may send another request onto the processor bus 23. A signal is also asserted setting up data for return to the processor 22a during S17. During S16 a decode of which bank of the read buffer 86 should be enabled is accomplished by decoding the least two significant address bits of the LPC bus 32 address bus. In the following cycle (S17), the data for the current read from the read buffer 86 is returned to the processor 22a. The state machine 54 transitions to state S18 and enables the next data word to the processor, if appropriate. If this is the case, a read match occurs and the state machine 54 loops back to state S17, where the next word is returned to the processor 22a. Otherwise, the state machine 54 returns to S0, and may restart a new Global Memory read or write cycle, if required. It is noted that the state machine 54 here "preempts" the processor 22a, and assumes that it will read consecutive addresses from the read buffer 86, when in pipeline mode. If, at the end of S18, there is a read request to a location in the read buffer 86, but not to an address contiguous with the address of the data just returned (i.e. the processor 22a has skipped a data word), a branch is made to state S19, where the correct word is enabled onto the processor 22a data bus, before a branch to state S17 is made to return the data to the processor 22a. This extra state ensures enough time for the read buffer 86 to drive the data bus 23a before the processor 22a latches the data. This tight loop (S17-S18-S17 etc.) enables the read buffer 86 to return data to the processor 22a every other cycle so as to accommodate the processor's maximum bandwidth.

In the case of a request from the processor 22a for a GM 26 read to an address already active in the read buffer 86, but made while the state machine 54 is in S0, a branch is made directly to state S19, enabling the data on this cycle. Operation then proceeds, as previously described, by branching to S17 and returning the data to the processor 22a.

It should also be noted that when either a LPC_R-REQ or LPC_WREQ is pending, a counter within the GM 26 state machine 54 is started. If his counter counts to a predetermined number of system clocks, indicating a timeout condition, the request is aborted. This returns the state machine 54 to S0. BUSERR is also asserted to interrupt the processor 22a.

Summary

The above described architecture and implementation provides a powerful and flexible interface capability for a microprocessor-based multiprocessor systems. Some of the functions implemented by the PBIF 22c are useful in any type of multiprocessor system, such as the internal timer logic. In addition, the Global Memory 26 interface provides increased performance from the relatively high latency Global Memory 26 subsystem. In the presently preferred embodiment certain functions are optimized around the characteristics of the selected microprocessor device. Thus, in other embodiments of the invention variations in certain of the features may be made to accommodate the characteristics of the attached processor. For example, variations in the interrupt structure may be made so as to accommodate a processor having more than one interrupt input. Also, variations in the state machine 54 may be required to accommodate different processors, such as the addition or deletion of certain states that provide processor-specific timing delays, etc.

Thus, while the invention has been particularly shown and described with respect to a preferred embodiment thereof, it will be understood by those skilled in the art that changes in form and details may be made therein without departing from the scope and spirit of the invention.

APPENDIX A

Global Address Bus Signal Definition

The address bus consists of GB_ACYCLE, GB_ATYPE, GB_A(31:0), GB_LEN(3:0), GB_PID(7:0), GB_PTAGE(7:0), GB_R/-W, GB_LOCK AND GB_RMW. This bus is used by master devices (e.g. processor cards) to initiate global memory r/w cycles. Access to the SVS global bus is gained by issuing a GB_RREQ or GB_WRFQ to the global bus master arbiter and receiving a GB_PGNT. A description of each address bus field is provided below:

GB_ACYCLE identifies a valid global bus address cycle. This signal is driven by the current global address bus master to validate the global address bus. Slave devices should validate r/w requests with GB_ACYCLE.

GB_ATYPE specifies a valid address cycle or IPC interrupt cycle. If GB_ATYPE is 1, the address bus specifies a valid global memory r/w request. If GB_ATYPE is 0, the address bus specifies and IPC interrupt cycle, and global bus slave devices should interpret GB_LEN(3:0) as the group select identifier GSI(3:0), and GB_A(31:0) as the processor select mask PSM(31:0). During IPC interrupt cycles, GB_R/-W, GB_LOCK and GB_RMW are not defined, and GB_AP(3:0) specifies parity for GB_A(31:0). GSM(2:1) selects the destination system unit. GSM(0) selects computation processors or I/O processors. HWID(4:2) is used to select one of the eight, four bit fields specified by the processor select mask.

GB_A(31:0) specifies the 32-byte block address during global bus r/w request cycles, thus providing a physical address range of 128 GB. During IPC interrupt cycles (GB_ATYPE=0), GB_A(31:0) specifies the processor select mask.

GB_AP(3:0) is the address parity bus. GB_AP(0) provides parity for GB_A(7:0), GB_AP(1) provides parity for GB_A(15:8), etc. Odd parity is used.

GB_LEN(3:0) indicates the block length during global bus read request cycles. Typically, processors issue single-word read request cycles (i.e. GB_LEN(3:0)=0); however, block-read cycles are supported by indicating a non-zero block length during global bus read request cycles. The corresponding block address indicates a valid starting block address for correct operation, and reply data is returned in proper order. The block length is specified in powers of two, where GB_LEN(3:0)=0,1,2, . . . ,16 indicates block lengths of 1,2,4 . . . ,$2^{16}$, respectively. During IPC interrupt cycles (GB_ATYPE=0), GB_LEN(3:0) specifies the group select identifier.

GB_PID(7:0) indicates the requesting processor identifier (PID) during global bus r/w request cycles. On a read request cycle, the PID is saved by address consumers (i.e., global memory cards) and later returned along with the corresponding reply data as GB_MID(7:0) to uniquely identify the destination processor. On a write request cycle, the PID is used by global memory cards to complete a decoupled, read-lock/write-unlock cycle by a given processor, thus preventing any other processor from performing any memory r/w operation to the locked global memory location.

GB_PTAG(7:0) is used by processors to uniquely tag multiple outstanding read requests. Like GB_PID(7:0), GB_PTAG(7:0) is saved by address consumers and later returned along with the corresponding reply data as GB_MTAG(7:0). Since read requests to different memory banks can return in arbitrary order, GB_PTAG(7:0) may optionally be used by processors to re-organize data when issuing multiple outstanding read requests.

GB_R/-W specifies a read (1) or write (0) cycle during valid global bus address cycles.

GB_LOCK conditions the current global bus r/w cycle. When inactive, it indicates a normal r/w cycle. When active, it indicates a decoupled, atomic r/w cycle. In global memory mode 0, a global bus read-lock cycle requests data from global memory and causes the affected global memory location to be locked until a subsequent write-unlock cycle is performed by the same processor that issued the lock-read cycle. This prevents any other processor from performing any memory r/w operation to the locked global memory location, thus supporting atomic global memory operations (e.g., test-and-set, compare-and-swap, fetch-and-add, etc.). In global memory mode 1, a read-lock cycle causes an atomic test-and-set operation at the global memory. The global memory returns the data at the specified address and then writes all ones to the entire 256-bit word.

GB_RMW identifies a partial global memory write cycle, which performs a read-modify-write operation at the global memory bank. RMW should be active whenever any of the eight 32-bit data slices contains partially written data.

Global Data Bus Signal Definition

The data bus consists of GB_DCYCLE, GB_D(255:0), GB_DP(31:0), GB_BE(31:0), GB_MID(7:0), GB_MTAG(7:0), GB_ECCERR, and GB_ERRTYPE. This bus is used by master devices to transfer write data or by slave devices (e.g., memory cards) to return read data. Access to the data bus is gained by issuing a GB_WREQ to the global bus master arbiter and receiving a GB_PGNT (processor write operation), or by issuing an GB_MREQ to the global bus slave arbiter and receiving an GB_MGNT (memory reply operation). Master devices drive the data bus one clock cycle after receiving a valid GB_PGNT, while slave devices drive the data bus upon receiving an GB_MGNT.

GB_DCYCLE identifies a valid global bus data cycle. This signal is driven by the global bus arbiter to validate global memory reply cycles.

GB_D(255:0) is the data bus. Each of the thirty-two data bytes may contain valid data, as indicated by the byte enables GB_BE(31:0)

GB_DP(31:0) is the data parity bus. GB_DP(0) provides parity for GB_D(7:0). GB_DP(1) provides parity for GB_D(15:8), etc. The UBIF driving the global bus data bus computes parity, while the receiving UBIF checks for valid parity. Odd parity is used.

GB_BE(31:0) are the individual byte enables. GB_BE(0) active indicates valid data on GB_D(7:0). GB_BF(1) active indicates valid data on GB_D(15:8), etc. During global memory write operations, GB_BF(31:0) validate each of the thirty-two data bytes on GB_D(255:0) and are used by the global memory cards to condition writing to the memory array. GB_BE(31:0) are always valid during global memory reply cycles since global memory read operations always return 256-bits worth of data.

GB_MID(7:0) carries the returned processor ID during global memory reply operations indicating the destination processor for the given data. GB_MID(7:0) reflects the value presented on GB_PID(7:0) during the corresponding read cycle. GB_MID(7:0) is inactive during processor write cycles.

GB_MTAG(7:0) carries the returned processor GB_PTAG(7:0) during global memory reply operations. This field is optionally used by processors to re-organize global memory reply data when issuing multiple outstanding read requests. GB_MTAG(7:0) reflects the value presented on GB_PTAG(7:0) during the corresponding read cycle. GMMTAG(7:0) is inactive during processor write cycles.

GB_NOCACHE inhibits buffering of the returned data. This is returned by slave devices along with reply data to indicate that the data is volatile and should not be buffered or cached.

GB_ECCERR and GB_ERRTYPE report the result of a global memory read operation. If ERRTYPE is active, then ERRTYPE indicates a corrected, single-bit error or an uncorrectable, double-bit error. The global memory card UBIF generates GB_ECCERR and GB_ERRTYPE during global memory read reply cycles.

Global Control Bus Signal Definition (GB_ACK, GB_NAK) are returned by a slave UBIF after receiving a valid global bus r/w request. (GB_ACK, GB_NAK) indicates to the master UBIF that the global bus r/w request has been successfully received by a slave UBIF, (GB_NAK, GB_ACK) indicates that the slave is currently busy and cannot accept the given r/w request. (GB_ACK, GB_NAK) active simultaneously signals bad parity detected on the address bus A(31:0). The master UBIF should retry the request after receiving a NAK condition or address parity error indication.

GB_APERR reports bad parity on the address bus GB_A(31:0), as compared to the supplied address bus parity, GB_AP(3:0). The UBIF driving the data bus generates parity, while the receiving UBIF checks and reports bad parity. GB_APERR is monitored by the console processor and is used to report global bus error conditions.

GB_DPERR reports bad parity on the data bus GB_D(255:0) for any enabled byte, as compared to the supplied data bus parity, GB_DP(31:0). The UBIF driving the data bus generates parity, while the receiving UBIF checks and reports bad parity. GB_DPERR is monitored by the console processor and is used to report global bus error conditions.

GB_BUSERR is used to signal an unrecognized global bus address cycle (i.e., no GB_ACK or GB_NAK returned). GB_BUSERR is monitored by the console processor and is used to report global bus error conditions.

GB_RESET is the master reset signal on the global bus. It is synchronized to the rising edge of the bus clock and is generated at power-on or under software control from the console processor.

Global Bus Slot-Specific Signal Definitions

The following signals are unique for each backplane slot.

GB_RREQ is the processor card global bus read request line. It provides access to the address bus, given GB_PGNT. For a single global bus cycle, GB_RREQ should be asserted and held until the corresponding GB_PGNT is returned. For multiple cycles, GB_RREQ should be held until the last GB_PGNT is received. Assuming no bus contention on the bus, the central global bus arbiter will grant back-to-back cycles to a processor card given an active GB_RREQ. GB_RREQ must be asserted very early in the clock cycle in order to meet Arbiter timing requirements, and should be deasserted very early after the GB_PGNT in order to prevent receiving a spurious GB_PGNT: an unused grant is not permitted.

GB_WREQ is the processor card global bus write request line. It provides access to the address and, one cycle later, the data bus, given GB_PGNT.

GB_PGNT is the processor card global bus grant line. This is returned by the central global bus arbiter to a single processor card during any given global bus cycle. It is used to enable the global bus address bus drivers during a current bus cycle, and conditionally enable the global bus data bus drivers, one cycle later, if GB_PGNT is issued in response to a GB_WREQ.

GB_MREQ is the memory card global bus request line. It provides access to the data bus for returning read data to processor cards.

GB_MGNT is the memory card global bus request line. This is returned by the global bus arbiter to a single memory card during any given global bus cycle. It should be used to enable the global bus data bus drivers during the current bus cycle.

GB_CARDID(3:0) is a slot specific four bit identifier that uniquely identifies each backplane slot. This four bit field is used to generate GB_PID(5:2) during global bus r/w request cycles.

GB_UNITID(1:0) is a backplane-specific 2-bit identifier that uniquely identifies each SVS system unit in a multi-system configuration. This 2-bit field is used to generate GB_PID(7:6) during global bus r/w request cycles.

Miscellaneous Global Bus Signals

GB_MCARD(3:0) are backplane signals that are used by global memory cards to determine the number of global memory cards in the system. Each memory card determines which of the four memory slots it is in from its GB_CARDID(3:0), and drives the GB_MCARD line corresponding to that slot. Each memory card also reads GB_MCARD(3:0) to determine a complete configuration of memory cards in the backplane, and thus the interleave factor to use.

| GLOBAL BUS SIGNAL SUMMARY | | |
|---|---|---|
| Signal Name | Width | Description |
| GB ACYCLE | 1 | Address cycle indicator |
| GB ATYPE | 1 | +Address/-Imessage Indicator |
| GB A | 32 | Address bus (32-byte block address) |
| GB AP | 4 | Address bus parity |
| GB LEN | 4 | Block length |
| GB PID | 8 | Processor request ID |
| GB PTAG | 7 | Processor request TAG |
| GB RW | 1 | +Read/-Write select |
| GB LOCK | 1 | Atomic cycle select |
| GB RMW | 1 | Read-modify-write signal |
| GB DCYCLE | 1 | Data cycle indicator |
| GB D | 256 | Data bus |
| GB BE | 32 | Byte Enables |
| GB DP | 32 | Data bus parity by byte |
| GB MID | 8 | Memory reply ID |
| GB MTAG | 7 | Memory reply TAG |
| GB NOCACHE | 1 | Don't cache |
| GB ECCERR | 1 | ECC error signal |
| GB ERRTYPE | 1 | ECC error type |
| GB ACK | 1 | Bus acknowledge |
| GB NAK | 1 | Bus no acknowledge |
| GB BUSSER | 1 | Bus error |
| GB BACKOFF | 1 | Memory back-off indicator |
| GB APERR | 1 | Address bus parity error |
| GB DPERR | 1 | Data bus parity error |
| GB RESET | 1 | Bus reset |
| | | The following signals are unique per slot |
| GB ECLK | 2 | Bus clock for ECL devices (differential) |
| GB TCLK | 2 | Bus clock for TTL devices (differential) |
| GB RREQ | 1 | Haster GBIF read request |
| GB WREQ | 1 | Master GBIF write request |
| GB PGNT | 1 | Master GBIF bus grant |
| GB MREQ | 3 | Slave GBIF reply request |
| GB MGNT | 1 | Slave GBIF bus grant |
| GB CARDID | 4 | Backplane slot ID |
| GB UNITID | 2 | Backplane ID |
| | | The following signals are daisy chained |
| GB SIN | 1 | Diagnostic bus serial in |
| GB SOUT | 1 | Diagnostic bus serial out |
| GBSCANI | 1 | Serial scan-in |
| GBSCANO | 1 | Serial scan-out |
| | | The following signals are special |
| GB MCARD | 4 | Memory card signals |

APPENDIX B

LPC Address Bus Signal Definitions

The LPC address bus consists of LPC_ACYCLE, LPO_ATYPE, LPC_A(31:0), LPC_LEN(3:0), LPC_PID(1:0), LPC_PTAG(7:0), LPC_RW, LPC_LOCK and LPC_RMW. This bus is shared by the four local processors and is use to initiate global memory r/w cycles. Access to the LPC address bus is gained by issuing a read request (LPC_RREQ) or write request (LPC_WREQ) to the LPC bus arbiter and by receiving a processor grant (LPC_PGNT). A description of each address bus field is provided below:

LPC_ACYCLE conditions a valid LPC bus local address cycle. This line is driven by the UBIF LPC bus arbiter to validate local LPC bus addresses. It is used by local LPC bus devices, such as IIIPPI I/O interfaces on the I/O processor card to validate LPC addresses. LPC_ACYCLE is valid for one cycle during the first half of an LPC ABUS cycle, indicating that a valid LPC bus addresses cycle can be sampled on the following rising clock edge.

LPC_ATYPE specifies a valid LPC address bus cycle or IPC or IPC interrupt cycle. If LPC_ATYPE=1, the LPC address bus specifies a valid r/w request. If LPC_ATYPE=0, the LPC bus identifies an IPC interrupt cycle. In this case, the UBIF interprets LPC_LEN(3:0) as the group select identifier GSI(3:0), and LPC_A(31:0) as the processor select mask PSM(310). During IPC interrupt cycles, LPC_RW, LPC_LOCK, and LPC_RMW are not defined.

LPC_A(3110) specifies the 32-byte block address during LPC r/w request cycles, thus providing a physical address range of 128 GB. During IPC interrupt cycles (LPC_ATYPE=0), LPC_A(31:0) specifies the processor select mask.

LPC_LEN(3:0) indicates the block length during LPC read request cycles. Typically, processor issue single-word read request cycles (i.e., LPC_LEN(3:0)=0). However, block-read cycles are supported by indicating a non-zero block length during LPC read request cycles. The corresponding block address must indicate a valid starting block address for correct operation, and reply data is returned in proper order. The block length is specified in powers of two, where LPC_LEN(3:0)=0, 1, 2, ..., 16 indicate block lengths of 1, 2, 4, ... 2++16 respectively. The current limitation imposed by UBIF is a block length of eight 286-bit words (or LPC_LEN(3:0)−3) per local device. During IPC interrupt cycles (LPC_ATYPE=0), LPC_LEN(3:0) specifies the processor group select.

LPC_LEN(1:0) indicates the requesting processor identifier (PID) during LPC r/w request cycles. On a read request cycle, the PID is saved by address consumers (i.e., global memory cards) and later returned along with the corresponding reply data as LPC_MID(1:0) to uniquely identify the destination processor. On a write request cycle, the PID is used by global memory cards to complete a decoupled, lock-read/lock-write cycle by a given processor, thus preventing any other processor from performing any memory r/w operation to the locked global memory bank. On the processor and IOP cards, the global bus processor identifier, LPC_PID(7:0), is composed by concatenating GB_UNITID(1:0), GB_CARDID(3:0), with the given LPC bus LPN(1:0).

LPC_PTAG(7:0) is used by processor to uniquely tag multiple outstanding read requests. I ike PID, PTAG is saved by address consumers and later returned along with the corresponding reply data as LPC_MTAG(7:0). Since read request to different memory banks can return in arbitrary order, PTAG can optionally be used by processors to re-organize data when issuing multiple outstanding read requests.

LPC_RW specifies a read (1) or write (0) cycle during valid LPC request cycles.

LPC_LOCK conditions the current LPC r/w cycle. When inactive, it indicates a normal r/w cycle. When active, it indicates a decoupled, atomic r/w cycle. In global memory mode 0, read-lock cycle requests data from global memory and causes the affected global memory address to be locked until a subsequent write-unlock cycle is performed by the same processor that issued the read-lock cycle. This prevents any other processor from performing any r/w operation to the looked global memory address, thus supporting atomic global memory operations (e.g., test-and-set, compare-and-swap, fetch-and-add, etc.). In global memory mode 1, a read-look cycle causes an atomic test-and-set operation at the global memory. The global memory returns the data at the specified address and then writes all 1s to the entire 256-bit word.

LPC_RMW identifies a partial global memory cycle, which requires a real-modify-write operation at the global memory bank. LPC_RMW should be active whenever any of the eight 32-bit data slices contains partially written data.

LPC Data Bus Signal Definitions

The data bus consists of LPC-DCYCLE, LPC_D(255:0), LPC_BE(31:0), LPC_MID(7:0), LPC_MTAG(7:0), LPC_GBPERR, LPC_ECCERR and LPC_ERRTYPE. This bus is used by processor to transfer write data to the UBIF of by the UBIF to return global memory data to processors. Processors gain access to the LPC data bus by issuing a LPC_WREQ to the LPC bus master arbiter and receiving a LPC_PGNT. A description of each data bus field is provided below:

LPC_DCYCLE conditions a valid LPC bus data cycle. This line is driven by the UBIF LPC bus data arbiter to validate LPC bus reply cycles. Data consumers should validate read reply cycles with LPC_DCYCLE. LPC_DYCYCLE is valid for one cycle during the first half of an LPC DBUS cycle.

LPC_D(255:0) is the data bus. Each of the thirty-two data bytes may contain valid data, as indicated by the byte enables LPC_BE(31:0).

LPC_BE(31:0) are the individual byte enables. LPC_BE(0) active indicates valid data LPC_D(7:0), LPC_BE(1) active indicates valid data on LPC_D(15:8), etc. During write operations, LPC_BE(31:0) validate each of the thirty-two data bytes on LPC_D(255:0). LPC_BE(31:0) are not defined during read reply cycles, since global memory read operations always return 256-bits of data.

LPC_MID(7:0) carries the returned processor ID during global memory reply operations indicating the destination processor for the given data. LPC_MID(1:0) reflects the vale presented on LPC_PID(1:0) during the corresponding read cycles. LPC_MID(1:0) is inactive during processor write cycles.

LPC_MTAG(7:0) carries the returned processor TAG during global memory reply operations. This field is optionally used by processors to re-organize global memory reply data when issuing multiple outstanding read requests. LPC_MTAG(7:0) reflects the value presented on LPC_PTAG(7:0) during the corresponding read cycle. LPC_MTAG(7:0) is inactive during processor write cycles.

LPC_NOCACHE inhibits buffering of the returned data. This is returned by memory devices along with reply data to indicate that the data is volatile and should not be buffered or cached. The UBIF returns LPC_NONCACHE to the destination processor along with the reply data.

LPC_ECCERR, LPC_ERRTYPE reports the result of a global memory read operation. If LPC_ERRTYPE is active, then LPC_ERRTYPE indicates a corrected, single-bit error (if 0) or an uncorrectable, double-bit error (if 1). These signals are inactive during processor write cycles.

LPC_GB_PERR reports if bad parity was detected on the global bus date lines LPC_D(25:0) during the memory read reply cycle. It is only valid during UBIF and PBIF data reply cycles and should be ignored at all other times.

LPC Control Bus Signal Definitions

The LPC control bus consists of LPC_ACK and LPC_NAK. These shared signals are used to acknowledge a valid LPC address and to indicated whether LPC bus requests are accepted or rejected. LPC_ACK and LPC_NAK are returned two cycles after a valid LPC address bus cycle has been issued to a recognized LPC address. The UBIF always returns LPC_ACK when processors issue global memory r/w requests, as indicated by conditioning an LPC_RREQ or LPC_WREQ with an active (i.e., 0) LPC_LG indication. An valid LPC address is indicated by the absence of both LPC_ACK and LPC_NAK, which implies that processors should abort the request. A description of each control bus signal is provided below:

LPC_ACK is returned by an address consumer to indicate that it has acknowledged a valid LPC address and that is has accepted the given r/w request. The UBIF always returns LPC_ACK when given a global address since the UBIF local bus arbiter only grants the LPC bus if there is room in the associated output queue to buffer the global bus request. However, local devices on the I/O processor card may not return LPC_ACK, either because of an unrecognized address on because they cannot accept the given request. LPC_NAK is returned by an address consumer to indicate that it has acknowledged a valid LPC address but that is not accepted the r/w request. The requestor should retry a NAKed cycle.

LPC Bus Arbitration Signal Definitions

The LPC bus arbitration control signals consist of LPC_RREQ(3:0), LPC_WREQ(3:0), LPC_LG(3:0), and LPC_RDY(3:0). Each of the four local processors has a Unique set OF these control signals, thus processor (i) is given LPC_RREQ(i), LPC_WREQ(i), LPC_LG(t), and LPC_RDY(i). LPC_RREQ(i), LPC_WREQ(i), and LPC_LG(i) are used to gain access of the LPC bus to issue local or global r/w requests, while LPC_RDY(i) is used by the UBIF-D chip to pace the return of global memory block read data to each local processor. These signals are described in more detail below. A description of each arbitration signal is provided below:

LPC_RREQ(3:0) are the unique processor read request signals. These are used to gain access to the LPC address bus to issue a local or global read request. LPC_LG(3:0) indicates whether the request is destined for a local device (1) or a global device (0). LPC_RREQ(i) should be generated on the rising edge of LPC_CLOCK and remain asserted until LPC_PGNT(i) is received.

LPC_WREQ(3:0) are the unique processor write request signals. These are used to gain access to both the LPC address bus and LPC data bus to issue a local or global write request. LPC_LG(3:0) indicates whether the request is destined for a local device (1) or a global device (0). LPC_WREQ(i) should be generated on the rising edge of LPC_CLOCK and remain asserted until LPC_PGNT(i) is received.

LPC_LG(3:0) are the unique processor +Local/-Global select signals. These are used to condition whether the current LPC_RREQ(i) or LPC_WREQ(i) is destined for a local device (1) or a global device (0). The timing of LPC_LG(i) is identical to LPC_RREQ(i) and LPC_WREQ(i).

LPC_PGNT(3:0) are the unique processor bus grant signals. During any given LPC_bus cycle, only one LPC_PGNT(i) is issued by the LPC bus arbiter. LPC_PGNT(i) is returned no sooner than one cycle after detecting a LPC_RREQ(i) or LPC_WREQ(i) and remains active for two clock cycles. LPC_PGNT(i) should be used directly to enable the LPC address bus drivers on a given processor. If a LPC_WREQ(i) was issued, then the processor should begin driving the LPC data bus one cycle after detecting LPC_PGNT(i). The LPC bus arbiter always deasserts LPC_PGNT(i) after two cycles, but may assert the same LPC_PGNT(i) one cycle later if the corresponding processor keeps LP_RREQ(i) or LPC_WREQ(i) asserted. Thus, any given processor is granted the LPC bus at most every other LPC bus cycle. LPC_RDY(5:0) are the unique processor ready signals. LPC_RDY(i) indicates to the UBIF that the processor is ready to accept read data. These are used primarily during block-read cycles to pace the rate at which a local processor or I/O device (e.g., the IIIPPI transmitter on the I/O processor card) accepts global memory read data. The UBIF returns data to a device at a peak rate of 320 MB/second, assuming 40 MHz and no bus contention. The local processor or I/O device interface can slow this rate by taking away LPC_RDY(i) upon receiving a data word.

Interrupt Message Support Definitions

LPC_IPCINTR(3:0) are the unique IPC interrupt signals. These are generated by the UBIF whenever it detects an IMSG cycle on the global bus which selects any of the four local processors. The UBIF generates a one-clock-cycle long LPC_IPCINTR(i) signal, which should be used by the PBIF chip to set the IPC interrupt bit in the processor interrupt register. The UBIF can issue back-to-back LPC_IPCINTR(i) signals, should there be back-to-back IMSG cycles that select the processor(i).

| Local Processor Card (LPC) Bus Signal Summary | | | |
|---|---|---|---|
| Signal Name | Width | Description | Type |
| −LPC ACYCLE | 1 | Addres cycle indicator | TP |
| LPC ATYPE | 1 | +Address/-Imessage select | TS |
| LPC A | 32 | Address bus (32-byte block | TS |
| LPC LEN | 4 | address) | TS |
| LPC PID | 2 | Block length | TS |
| LPC PTAG | 7 | Processor request ID | TS |
| LPC RW | 1 | Processor request TAG | TS |
| LPC LOCK | 1 | +Read/-Write select | TS |
| LPC RKW | 1 | Atomic cycle select Read-modify-write signal | TS |
| −LPC DCYCLE | 1 | Data cycle indicator | TP |
| LPC D | 256 | Data bus | TS |
| LPC BE | 32 | Byte Enables | TS |
| LPC MID | 2 | Memory reply ID | TS |
| LPC MTAG | 7 | Memory reply TAG | TS |
| LPC ECCERR | 1 | ECC error signal | TS |
| LPC ERRTYPE | 1 | ECC error type (0 = CECC, 1 = UECC) | TS |
| LPC NONCACHE | 1 | Don't cache | TS |
| LPC GBPERR | 1 | GigaBus parity error | TS |
| −LPC ACK | 1 | Bus acknowledge | TS |
| −LPC NAK | 1 | Bus no-acknowledge | TS |
| Total | 354 | The following signals are unique per processor | |
| LPC LG | 1 | +Local/-Global indicator | TP |
| −LPC RREQ | 1 | LPC read request | TP |
| −LPC WREQ | 1 | LPC write request | TP |
| −LPC PGNT | 1 | LPC bus processor grant | TP |
| −LPC RDY | 1 | Processor ready indicator | TP |
| −LPC IPCINTR | 1 | Interrupt message interrupt | TP |
| +LPC ETCLK | 2 | ECL System clock | ECL |
| −LPC ETCLK | 2 | ECL System clock | ECL |
| Total | 344 | The following signals are daisy chained | |
| LPC SIN | 1 | Diagnostic bus serial in | TP |
| LPC SOUT | 1 | Diagnostic bus serial out | TP |
| Total | 2 | The following signals form the Gigabus snoop bus | |
| LPC GB BACKOFF | 1 | Gigabus backoff signal | TP |
| LPC GB ACYCLE | 1 | GigaBus address cycle | TP |
| LPO GB ATYPE | 1 | GigaBus +address/Imessage select | TP |
| LPC GB RW | 1 | GigaBus Read/-Write select | TP |
| LPC OB LEN | 4 | GigaBus block length | TP |
| LPC GB A | 32 | GigaBus address | TP |
| −LPC RESET | 1 | Synchronous system reset | TP |

Having thus described our invention, what we claim as new, and desire to secure by Letters Patent is:

1. Interface apparatus for coupling to a microprocessor device, comprising:
   input means for coupling to the microprocessor device for inputting signals from address signal lines and from control signal lines, the signals being generated by the microprocessor device;
   address decoding means, having an input coupled to the address signal lines and being responsive to the signals inputted from the address signal lines, for determining if a microprocessor device-generated memory access is directed to a private memory means, the private memory means being directly accessible only by the microprocessor device and not by other microprocessor devices, or to a shared memory means that is accessible by a plurality of microprocessor devices;

first output means, coupled to and responsive to an operation of the address decoding means, for outputting first address signals on first address signal lines and for outputting first control signals on first control signal lines in response to the microprocessor device generating a memory access to the private memory means, the first address signal lines and the first control signal lines being coupled to the private memory means; and second output means, coupled to and responsive to the operation of the address decoding means, for outputting second address signals on second address signal lines and for outputting second control signals on second control signal lines in response to the microprocessor device generating a memory access to the shared memory means, the second address signal lines and the second control signal lines being coupled to the shared memory means.

2. Interface apparatus as set forth in claim 1 and further comprising means, having an output coupled to the second output means, for generating an interprocessor communications message that is directed to one or more other microprocessor devices that are coupled to the second address signal lines and the second control signal lines in common with the shared memory means.

3. Interface apparatus as set forth in claim 1 and further comprising means for bidirectionally coupling to a data bus that is coupled in common to the interface apparatus, the private memory means, and to the microprocessor device.

4. Interface apparatus as set forth in claim 3 wherein said means for bidirectionally coupling includes data storage means coupled to the data bus for buffering data read from the shared memory means by the microprocessor device and for buffering data written to the shared memory means by the microprocessor device.

5. Interface apparatus as set forth in claim 4 and further comprising means, responsive to the address decoding means determining that a microprocessor device-generated read memory access is directed to the shared memory means, and further responsive to a determination that an address associated with the read memory access corresponds to an address associated with a data unit stored within the data storage means, for providing the data unit to the data bus from the data storage means without causing the second output means to output second address signals on the second address signal lines and to output second control signals on the second control signal lines in response to the microprocessor device-generated read memory access that is directed to the shared memory means.

6. Interface apparatus as set forth in claim 5 and further comprising means, responsive to a write access to the shared memory means at an address that corresponds to the address of a data unit stored within the data storage means, for invalidating the corresponding data unit stored within the data storage means.

7. Interface apparatus as set forth in claim 1 and further comprising:

means for bidirectionally coupling to a data bus that is coupled between the interface apparatus, the private memory means, and the shared memory means; and means, responsive to data stored within a control register means of the interface apparatus by the microprocessor device, for controlling the operation of the first output means and the second output means for transferring data units over the data bus between the private memory means and the shared memory means.

8. Interface apparatus for coupling to a microprocessor device, comprising:

input means for coupling to the microprocessor device for inputting signals from address signal lines and from control signal lines, the signals being generated by the microprocessor device;

address decoding means, having an input coupled to the address signal lines and being responsive to the signals inputted from the address signal lines, for determining if a microprocessor-generated memory access is directed to a private memory means, the private memory means being directly accessible only by the microprocessor device and not by other microprocessor devices, or to a shared memory means that is accessible by a plurality of microprocessor devices;

first output means, coupled to and responsive to an operation of the address decoding means, for outputting first address signals on first address signal lines and for outputting first control signals on first control signal lines in response to the microprocessor device generating a memory access to the private memory means, the first address signal lines and the first control signal lines being coupled to the private memory means;

second output means, coupled to and responsive to the operation of the address decoding means, for outputting second address signals on second address signal lines and for outputting second control signals on second control signal lines in response to the microprocessor device generating a memory access to the shared memory means, the second address signal lines and the second control signal lines being coupled to the shared memory means;

and further comprising means, having an output coupled to the first output means, for periodically generating refresh timing signals for the private memory means.

9. Interface apparatus for coupling to a microprocessor device, comprising:

input means for coupling to the microprocessor device for inputting signals from address signal lines and from control signal lines, the signals being generated by the microprocessor device;

address decoding means, having an input coupled to the address signal lines and being responsive to the signals inputted from the address signal lines, for determining if a microprocessor-generated memory access is directed to a private memory means, the private memory means being directly accessible only by the microprocessor device and not by other microprocessor devices, or to a shared memory means that is accessible by a plurality of microprocessor devices;

means for bidirectionally coupling to a data bus that is coupled in common to the interface apparatus, the private memory means, and to the microprocessor device, said means for bidirectionally coupling including data storage means coupled to the data bus for buffering data read from the shared memory means by the microprocessor device and for buffering data written to the shared memory means by the microprocessor device;

first output means, coupled to and responsive to an operation of the address decoding means, for outputting first address signals on first address signal lines and for outputting first control signals on first control signal lines in response to the microprocessor device generating a memory access to the private memory means, the first address signal lines and the first control signal lines being coupled to the private memory means;

second output means, coupled to and responsive to the operation of the address decoding means, for outputting second address signals on second address signal lines and for outputting second control signals on second control signal lines in response to the microprocessor device generating a memory access to the shared memory means, the second address signal lines and the second control signal lines being coupled to the shared memory means;

means, responsive to the address decoding means determining that a microprocessor device-generated read memory access is directed to the shared memory means, and further responsive to a determination that an address associated with the read memory access corresponds to an address associated with a data unit stored within the data storage means, for providing the data unit to the data bus from the data storage means without causing the second output means to output second address signals on the second address signal lines and to output second control signals on the second control signal lines in response to the microprocessor device-generated read memory access directed to the shared memory means; and means, responsive to an occurrence of a predetermined number of microprocessor device-generated read memory accesses that have an address that corresponds to an address associated with a data unit stored within the data storage means, for activating the second output means to output second address signals on the second address signal lines and to output second control signals on the second control signal lines to load the data storage means with data units from the shared memory means.

10. Interface apparatus for coupling to a microprocessor device, comprising:

input means for coupling to the microprocessor device for inputting signals from address signal lines and from control signal lines, the signals being generated by the microprocessor device;

address decoding means, having an input coupled to the address signal lines and being responsive to the signals inputted from the address signal lines, for determining if a microprocessor-generated memory access is directed to a private memory means, the private memory means being directly accessible only by the microprocessor device and not by other microprocessor devices, or to a shared memory means that is accessible by a plurality of microprocessor devices;

means for bidirectionally coupling to a data bus that is coupled in common to the interface apparatus, the private memory means, and to the microprocessor device, said means for bidirectionally coupling including data storage means coupled to the data bus for buffering data read from the shared memory means by the microprocessor device and for buffering data written to the shared memory means by the microprocessor device;

first output means, coupled to and responsive to an operation of the address decoding means, for outputting first address signals on first address signal lines and for outputting first control signals on first control signal lines in response to the microprocessor device generating a memory access to the private memory means, the first address signal lines and the first control signal lines being coupled to the private memory means; and second output means, coupled to and responsive to the operation of the address decoding means, for outputting second address signals on second address signal lines and for outputting second control signals on second control signal lines in response to the microprocessor device generating a memory access to the shared memory means, the second address signal lines and the second control signal lines being coupled to the shared memory means; wherein the data bus has a width of (m) bits, wherein the microprocessor device includes an internal cache having a cache line width of (n) bits, wherein the data storage means is separate from said internal cache and has a width of (n) bits, and wherein (n)=(x)(m), where (x) is an integer having a value that is greater than one.

11. A multiprocessor data processing system, comprising:

a plurality of processor nodes each of which is coupled one to another by a local bus and, through a local bus/global bus interface circuit, to a shared memory means through a global bus, each of the processor nodes including, a microprocessor device;

private memory means that is directly accessible only by the microprocessor device and not by other microprocessor devices; and interface means coupled to the microprocessor device, the interface means including, input means for inputting signals from address signal lines and from control signal lines, the signals being generated by the microprocessor device;

address decoding means, having an input coupled to the address signals lines and being responsive to the address signal lines, for determining if a microprocessor device generated memory access is directed to the private memory means or to the shared memory means;

first output means, coupled to and responsive to an operation of the address decoding means, for outputting first address signals on first address signal lines and for outputting first control signals on first control signal lines in response to the microprocessor device generating a memory access to the private memory means, the first address signal lines and the first control signal lines being coupled to the private memory means; and second output means, coupled to and responsive to the operation of the address decoding means, for outputting second address signals on second address signal lines and for outputting second control signals on second control signal lines in response to the microprocessor device generating a memory access to the shared memory means, the second address signal lines and the second control signal lines being coupled to the shared memory means through the local bus, the local bus/global bus interface circuit, and the global bus.

12. A multiprocessor data processing system as set forth in claim 11 wherein the interface means further includes means, having an output coupled to the second output means, for outputting an interprocessor communications message that is transmitted over the local bus, through the local bus/global bus interface circuit, and over the global bus to one or more of the other microprocessor devices.

13. A multiprocessor data processing system as set forth in claim 11 wherein each of the processor nodes further includes a data bus coupled in common to the interface means, the private memory means, and to the microprocessor device, and wherein each of the processor nodes further includes data storage means that is bidirectionally coupled to the data bus and to the global bus through the local bus and the local bus/global bus interface circuit for buffering data read from the shared memory means by the microprocessor device and for buffering data written to the shared memory means by the microprocessor device.

14. A multiprocessor data processing system as set forth in claim 13 wherein the interface means further includes means, responsive to the address decoding means determining that a microprocessor device-generated read memory access is directed to the shared memory means, and further responsive to a determination that an address associated with the read memory access corresponds to an address associated with a data unit stored within the data storage means, for providing the data unit to the data bus from the data storage means without causing the second output means to output second address signals on the second address signal lines and to output second control signals on the second control signal lines to access the shared memory means.

15. A multiprocessor data processing system as set forth in claim 14 wherein the interface means further includes means, responsive to an occurrence of a predetermined number of microprocessor-device generated read memory accesses each having an address that corresponds to an address associated with a data unit stored within the data storage means, for activating the second output means to output second address signals on the second address signal lines and to output second control signals on the second control signal lines for accessing the shared memory means to load the data storage means with data units from the shared memory means.

16. A multiprocessor data processing system as set forth in claim 14 wherein the interface means further includes means, responsive to a write access on the global bus to the shared memory means at an address that corresponds to the address of a data unit stored within the data storage means, for invalidating the corresponding data unit stored within the data storage means.

17. A multiprocessor data processing system as set forth in claim 13 wherein the interface means further includes means, responsive to the address decoding means determining that a microprocessor device-generated write memory access is directed to the shared memory means, and further responsive to a determination that an address associated with the write memory access corresponds to an address associated with a data unit stored within the data storage means, for storing one or more bytes written by the microprocessor device within the data storage means without causing the second output means to output second address signals on the second address signal lines and to output second control signals on the second control signal lines to access the shared memory means.

18. A multiprocessor system as set forth in claim 17 wherein the interface means further includes means, responsive to a predetermined number of bytes being written to the data storage means by the microprocessor device, for causing a content of the data storage means to be written to the shared memory means.

19. A multiprocessor system as set forth in claim 13 wherein the local data bus has a width of N bytes, wherein the data storage means includes write data buffer means having a width of M bytes, where M is greater than N, and wherein said means for storing byte enable signals generated by the microprocessor device has a capacity to store up to M byte enable signals.

20. A multiprocessor data processing system comprising:
a plurality of processor nodes each of which is coupled to a shared memory means by a global bus, each of the processor nodes including, a microprocessor device;
private memory means accessible only by the microprocessor device and not by other microprocessor devices; and
interface means coupled to the microprocessor device, the interface means including,
input means for inputting signals from address signal lines and control signal lines, the signals being generated by the microprocessor device;
address decoding means, having an input coupled to the address signals lines and being responsive to the address signal lines, for determining if a microprocessor device-generated memory access is directed to the private memory means or to the shared memory means;
first output means, coupled to and responsive to an operation of the address decoding means, for outputting first address signals on first address signal lines and for outputting first control signals on first control signal lines in response to the microprocessor device generating a memory access to the private memory means, the first address signal lines and the first control signal lines being coupled to the private memory means; and
second output means, coupled to and responsive to the operation of the address decoding means, for outputting second address signals on second address signal lines and for outputting second control signals on second control signal lines in response to the microprocessor device generating a memory access to the shared memory means, the second address signal lines and the second control signal lines being coupled to the shared memory means through the global bus;
wherein the interface means further includes means, having an output coupled to the first output means, for periodically generating refresh timing signals for the private memory means.

21. A multiprocessor system
a plurality of processor nodes each of which is coupled to a shared memory means by a global bus, each of the processor nodes including,
a microprocessor device;
private memory means accessible only by the microprocessor device and not by other microprocessor devices; and
interface means coupled to the microprocessor device, the interface means including, input means for inputting signals from address signal lines and control signal lines, the signals being generated by the microprocessor device;

address decoding means, having an input coupled to the address signals lines and being responsive to the address signal lines, for determining if a microprocessor device-generated memory access is directed to the private memory means or to the shared memory means;

first output means, coupled to and responsive to an operation of the address decoding means, for outputting first address signals on first address signal lines and for outputting first control signals on first control signal lines in response to the microprocessor device generating a memory access to the private memory means, the first address signal lines and the first control signal lines being coupled to the private memory means; and second output means, coupled to and responsive to the operation of the address decoding means, for outputting second address signals on second address signal lines and for outputting second control signals on second control signal lines in response to the microprocessor device generating a memory access to the shared memory means, the second address signal lines and the second control signal lines being coupled to the shared memory means through the global bus;

wherein each of the processor nodes further includes, a local data bus coupled in common to the interface means, the private memory means, and to the microprocessor device; and data storage means that is bidirectionally coupled to the local data bus and to a global data bus of the global bus for buffering data read from the shared memory means by the microprocessor device and for buffering data written to the shared memory means by the microprocessor device;

wherein the microprocessor device has an internal cache, separate from the data storage means, having a cache line width of (m) bits, wherein the data storage means and a global data bus each have a width of (m) bits, wherein the local data bus has a width of (n) bits, and wherein (n) is less than (m).

22. A multiprocessor system as set forth in claim 21 wherein the data storage means further includes means for storing byte enable signals generated by the microprocessor device in conjunction with data bytes written to the shared memory means by the microprocessor device.

23. A multiprocessor system as set forth in claim 22 and further including means, responsive to a predetermined number of byte enable signals being stored within said byte enable storing means, for causing the data bytes that were written by the microprocessor device, and that are buffered within said storage means, to be written to said shared memory means in conjunction with the buffered byte enable signals.

24. A multiprocessor system as set forth in claim 22 and further including means, responsive to a read access by the microprocessor device of data having a shared memory means address that corresponds to a shared memory means address of data stored within said data storage means, for causing the buffered data bytes within said storage means to be written to said shared memory means in conjunction with the buffered byte enable signals.

25. Interface apparatus for coupling to a data processor, comprising:

input means for coupling to the data processor for inputting signals from address signal lines and from control signal lines, the signals being generated by the data processor;

address decoding means, having an input coupled to the address signal lines and being responsive to the signals inputted from the address signal lines, for determining if a data processor-generated memory access is directed to one of a system memory means that is accessible over a system bus means and a local memory means that is accessible over a local bus means;

output means, coupled to and responsive to an operation of the address decoding means, for outputting address signals on first address signal lines and for outputting control signals on first control signal lines for accessing the local memory means over the local bus means in response to the data processor generating a memory access to the local memory means, said output means further outputting address signals on second address signal lines and outputting control signals on second control signal lines for accessing the system memory means over the system bus means in response to the data processor generating a memory access to the system memory means; and data storage means coupled by a data bus to the data processor for buffering data to be written to the system memory means by the data processor, the data storage means comprising write data buffer means and means for storing byte enable signals generated by the data processor in conjunction with data bytes to be written to the system memory means by the data processor; wherein the data bus has a width of N bytes, wherein the write data buffer means has a width of M bytes, where M is greater than N, wherein said means for storing byte enable signals generated by the data processor has a capacity to store up to M byte enable signals, and wherein individual ones of said M byte enable signals correspond to one of said M bytes and indicate, when asserted, that the corresponding one of the M bytes is to be written to the system memory means.

26. Interface apparatus for coupling to a data processor, comprising:

input means for coupling to the data processor for inputting signals from address signal lines and from control signal lines, the signals being generated by the data processor;

address decoding means, having an input coupled to the address signal lines and being responsive to the signals inputted from the address signal lines, for determining if a data processor-generated memory access is directed to one of a system memory means that is accessible over a system bus means and a local memory means that is accessible over a local bus means;

output means, coupled to and responsive to an operation of the address decoding means, for outputting address signals on first address signal lines and for outputting control signals on first control signal lines for accessing the local memory means over the local bus means in response to the data processor generating a memory access to the local memory means, said output means further outputting address signals on second address signal lines and outputting control signals on second control signal lines for accessing the system memory means over the system bus means in response to the data processor generating a memory access to the system memory means;

data storage means coupled by a data bus to the data processor for buffering data to be written to the system memory means by the data processor, the data storage means comprising write data buffer means and means for storing byte enable signals generated by the data processor in conjunction with data bytes to be written to the system memory means by the data processor; wherein the data bus has a width of N bytes, wherein the write data buffer means has a width of M bytes, where M is greater than N, and wherein said means for storing byte enable signals generated by the data processor has a capacity to store up to M byte enable signals;

means, responsive to an occurrence of a data processor write to a system memory means address that differs from an address associated with data previously buffered within said write data buffer means, for causing the previously buffered data to be written to said system memory means in conjunction with corresponding buffered byte enable signals;

and means, responsive to an occurrence of a predetermined number of byte enable signals being stored within said byte enable storing means, for causing the previously buffered data to be written to said system memory means in conjunction with corresponding buffered byte enable signals.

27. Interface apparatus for coupling to a data processor, comprising:

input means for coupling to the data processor for inputting signals from address signal lines and from control signal lines, the signals being generated by the data processor;

address decoding means, having an input coupled to the address signal lines and being responsive to the signals inputted from the address signal lines, for determining if a data processor-generated memory access is directed to one of a system memory means that is accessible over a system bus means and a local memory means that is accessible over a local bus means;

output means, coupled to and responsive to an operation of the address decoding means, for outputting address signals on first address signal lines and for outputting control signals on first control signal lines for accessing the local memory means over the local bus means in response to the data processor generating a memory access to the local memory means, said output means further outputting address signals on second address signal lines and outputting control signals on second control signal lines for accessing the system memory means over the system bus means in response to the data processor generating a memory access to the system memory means;

data storage means coupled by a data bus to the data processor for buffering data to be written to the system memory means by the data processor, the data storage means comprising write data buffer means and means for storing byte enable signals generated by the data processor in conjunction with data bytes to be written to the system memory means by the data processor; wherein the data bus has a width of N bytes, wherein the write data buffer means has a width of M bytes, where M is greater than N, and wherein said means for storing byte enable signals generated by the data processor has a capacity to store up to M byte enable signals;

means, responsive to an occurrence of a data processor write to a system memory means address that differs from an address associated with data previously buffered within said write data buffer means, for causing the previously buffered data to be written to said system memory means in conjunction with corresponding buffered byte enable signals;

and means, responsive to an occurrence of a data processor read of data having a system memory means address that corresponds to an address of data previously buffered within said write data buffer means, for causing the previously buffered data to be written to said system memory means in conjunction with corresponding buffered byte enable signals.

28. Interface apparatus for coupling to a data processor, comprising:

input means for coupling to the data processor for inputting signals from address signal lines and from control signal lines, the signals being generated by the data processor;

address decoding means, having an input coupled to the address signal lines and being responsive to the signals inputted from the address signal lines, for determining if a data processor-generated memory access is directed to one of a system memory means that is accessible over a system bus means and a local memory means that is accessible over a local bus means;

output means, coupled to and responsive to an operation of the address decoding means, for outputting address signals on first address signal lines and for outputting control signals on first control signal lines for accessing the local memory means over the local bus means in response to the data processor generating a memory access to the local memory means, said output means further outputting address signals on second address signal lines and outputting control signals on second control signal lines for accessing the system memory means over the system bus means in response to the data processor generating a memory access to the system memory means;

data storage means coupled by a data bus to the data processor for buffering data to be written to the system memory means by the data processor, the data storage means comprising write data buffer means and means for storing byte enable signals generated by the data processor in conjunction with data bytes to be written to the system memory means by the data processor; wherein the data bus has a width of N bytes, wherein the write data buffer means has a width of M bytes, where M is greater than N, and wherein said means for storing byte enable signals generated by the data processor has a capacity to store up to M byte enable signals;

means, responsive to an occurrence of a data processor write to a system memory means address that differs from an address associated with data previously buffered within said write data buffer means, for causing the previously buffered data to be written to said system memory means in conjunction with corresponding buffered byte enable signals;

and means, responsive to an occurrence of a data processor locked-write request to said system memory means, for causing previously buffered data to be written to said system memory means in conjunction with corresponding buffered byte enable signals.

29. Interface apparatus for coupling to a data processor, comprising:

input means for coupling to the data processor for inputting signals from address signal lines and from control signal lines, the signals being generated by the data processor;

address decoding means, having an input coupled to the address signal lines and being responsive to the signals inputted from the address signal lines, for determining if a data processor-generated memory access is directed to one of a system memory means that is accessible over a system bus means and a local memory means that is accessible over a local bus means;

output means, coupled to and responsive to an operation of the address decoding means, for outputting address signals on first address signal lines and for outputting control signals on first control signal lines for accessing the local memory means over the local bus means in response to the data processor generating a memory access to the local memory means, said output means further outputting address signals on second address signal lines and outputting control signals on second control signal lines for accessing the system memory means over the system bus means in response to the data processor generating a memory access to the system memory means;

data storage means coupled by a data bus to the data processor for buffering data to be written to the system memory means by the data processor, the data storage means comprising write data buffer means and means for storing byte enable signals generated by the data processor in conjunction with data bytes to be written to the system memory means by the data processor; wherein the data bus has a width of N bytes, wherein the write data buffer means has a width of M bytes, where M is greater than N, wherein said means for storing byte enable signals generated by the data processor has a capacity to store up to M byte enable signals, and wherein individual ones of said M byte enable signals correspond to one of said M bytes and indicate, when asserted, that the corresponding one of the M bytes is to be written to the system memory means;

and means, responsive to an occurrence of a data processor write to a system memory means address that differs from an address associated with data previously buffered within said write data buffer means, for causing the previously buffered data to be written to said system memory means in conjunction with corresponding buffered byte enable signals.

* * * * *